(12) United States Patent
Sugita et al.

(10) Patent No.: US 8,054,288 B2
(45) Date of Patent: Nov. 8, 2011

(54) ELECTROPHORESIS DISPLAY DEVICE

(75) Inventors: Tatsuya Sugita, Takahagi (JP); Tetsuya Ooshima, Mobara (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 11/749,296

(22) Filed: May 16, 2007

(65) Prior Publication Data

US 2007/0268245 A1 Nov. 22, 2007

(30) Foreign Application Priority Data

May 19, 2006 (JP) .................................. 2006-139681

(51) Int. Cl.
*G09G 3/34* (2006.01)

(52) U.S. Cl. ....................................... 345/107; 359/296

(58) Field of Classification Search .................. 345/107, 345/204, 690; 359/290, 296
See application file for complete search history.

(56) References Cited

U.S. PATENT DOCUMENTS

| | | | |
|---|---|---|---|
| 6,639,580 B1 * | 10/2003 | Kishi et al. ............... | 345/107 |
| 7,227,525 B2 * | 6/2007 | Kishi ....................... | 345/107 |
| 7,256,925 B2 * | 8/2007 | Noh et al. ................ | 359/265 |
| 2006/0066933 A1 * | 3/2006 | Jagt et al. ................ | 359/265 |

FOREIGN PATENT DOCUMENTS

| | | |
|---|---|---|
| JP | 2004020818 | 1/2004 |
| WO | WO 99/53373 | 10/1999 |

* cited by examiner

*Primary Examiner* — Stephen Sherman
(74) *Attorney, Agent, or Firm* — Antonelli, Terry, Stout & Kraus, LLP.

(57) ABSTRACT

An object of the present invention is to realize an image display device for color display with high luminance and high contrast. In the present invention, a unit cell 111 is filled with electrophoresis ink including two kinds of particles different in chargeability and color being dispersed in transmissive solvent 107. Voltage is applied to an opposite electrode 103, a stacked lower electrode 104 and an upper electrode 105 and thereby electrically charged particles 108a and charged particles 108b are moved to a first opening 106a and a second opening 106b where an insulating layer 110 is provided on the lower electrode 104 and the upper electrode 105. Thus assemblage and diffusion state of two kinds of particles are controlled. Thereby, a unit cell 111 obtains four display colors. Since the lower electrode 104 can be made to be a reflecting layer covering the entire unit cell, it is possible to make the aperture ratio large and the reflection percentage large.

23 Claims, 12 Drawing Sheets

ELECTROPHORESIS DISPLAY DEVICE

BACKGROUND OF THE INVENTION (1) Field of the Invention

The present invention relates to a particle mobile type image display device such as an electrophoresis display device and the like which switches the display state with pigmented particles moving in a solvent.

(2) Description of Related Art

WO 99/53373 discloses a color reflection display device including two kinds of pigmented phoretic particles being different in charging property and pigmentation filled inside a unit cell so as to move the two kinds of pigmented phoretic particles independently by applying voltage to three drive electrodes to display three colors of two kinds of pigmented phoretic particles and electrophoresis liquid color or three colors of two kinds of pigmented phoretic particles and color filter color arranged on the rear side of the unit cell. That display device is described to take white particles and pigmented color particles as two kinds of pigmented phoretic particles and adopts a color filter establishing relation of complimentary color with the pigmented color particles and thereby display four colors of white, black and the color of the pigmented color particles and the color of the color filter. Moreover, it is described that color display is implemented in use of three sub pixels different in display color with a unit cell being a sub pixel.

JP-A-2004-20818 discloses an electrophoresis display device having a pixel configuration by arranging, in a stacked arrangement or in a parallel arrangement, unit cells including two display electrodes arranged in approximately overlapped positions in a view from an observer, two collect electrodes and two kinds of transmissive pigmented phoretic particle presenting mutually different charging polarity and color presentation. That display device displays four colors of white, black and two kinds of colors of transmissive pigmented phoretic particle in a unit cell by combining red, green and blue for transmissive pigmented phoretic particles or combing cyan, yellow and magenta establishing relation of complimentary color with red, green and blue to arrange white scattering layer in a display electrode portion. In addition, likewise WO 99/53373, it is described that color display is performed using three sub pixels different in display color with a unit cell being a sub pixel.

However, in the display device of WO 99/53373, two of the three drive electrodes are electrodes for collecting particles arranged on the same substrate. It is necessary to arrange those electrodes to provide a large spacing in between in order to display the color of a color filter with high luminance. On the other hand, in order to display the colors of particles sufficiently, it is necessary to arrange the particles to spread between those electrodes. However, it is difficult to arrange the drive force to act so as to spread the particles between the two drive electrodes with three drive electrodes. It is considered to give rise to a problem that the particles do not spread well between the electrodes or response time gets long.

The display device in JP-A-2004-20818 adopts four electrodes, there have been problems that independent drive thereof and, in particular, the drive method, the drive circuit and the electrode wiring of two electrodes provided on the substrate on the light incident side become complicated.

In addition, in any display device, color display is implemented with three units of sub pixels. Therefore, the portion of the bulkheads and the capsule wall for separating the sub pixel will become abundant to increase the portion not contributing to the display operation and to make aperture ratio small, giving rise to a problem that reflection percentage drops or contrast drops. Moreover, there were such a problem as well that fine division into sub pixels makes process accuracy severe and the number of wiring gets abundant or the number of drive device gets abundant in active drive provided with a drive device in each sub pixel.

In addition, also in any display device, at least two electrodes are arranged in parallel in the same layer of the same substrate and, therefore, are required to be arranged to provide spacing between the electrodes. That spacing portion does not contribute to the display operation, giving rise as well to a problem of dropping reflection percentage or dropping contrast.

The problem to be solved by the present invention is to realize an electrophoresis display device in a simple configuration with high reflection index or transmission rate and contrast.

BRIEF SUMMARY OF THE INVENTION

In order to solve the above described problems, the present invention is configured to have one substrate on which a first pixel electrode and a second pixel electrode arranged thereon are formed; the other substrate, where an opposite electrode is formed, arranged opposite to the one substrate; a plurality of bulkheads dividing the spacing between a pair of substrates into a plurality of regions; two kinds of charged particles filling, in plurality, to a pixel region surrounded by the one substrate, the other substrate and the bulkheads and being different in color and charged polarity; a first insulating layer formed between the first pixel electrode and the second pixel electrode having a first insulating portion and a first opening being present on the first pixel electrode; and a second insulating layer formed on the second pixel electrode having a second insulating portion and a second opening, wherein potential between the first pixel electrode and the opposite electrode and between the second pixel electrode and the opposite electrode is controlled to display an image.

In addition, the configuration consists of one substrate where a first pixel electrode and a second pixel electrode arranged thereon are formed; the other substrate, where an opposite electrode is formed, arranged opposite to one substrate; a plurality of bulkheads dividing the spacing between a pair of substrates into a plurality of regions; two kinds of charged particles filling, in plurality, to a pixel region surrounded by the one substrate, the other substrate and the bulkheads and being same color but different in charged polarity; a first insulating layer formed between the first pixel electrode and the second pixel electrode having a first insulating portion and a first opening being present on the first pixel electrode; and a second insulating layer formed on the second pixel electrode having a second insulating portion and a second opening, wherein potential between the first pixel electrode and the opposite electrode and between the second pixel electrode and the opposite electrode is controlled to display an image.

In addition, the configuration consists of one substrate where a first pixel electrode and a second pixel electrode arranged thereon are formed; the other substrate, where an opposite electrode is formed, arranged opposite to the substrate; a plurality of bulkheads dividing the spacing between a pair of substrates into a plurality of regions; two kinds of charged particles filling, in plurality, to a sub-pixel region surrounded by the one substrate, the other substrate and the bulkheads and being different in color and charged polarity; a first insulating layer formed between the first pixel electrode and the second pixel electrode having a first insulating portion and a first opening being present on the first pixel electrode; and a second insulating layer formed on the second pixel electrode having a second insulating portion and a second opening, wherein in the case of adopting the two sub-pixel regions as a pixel, the one sub-pixel region is charged with charged particles in two colors selected from the three primary colors in addition mixture; the other sub-pixel region is charged with charged particles in the remaining single color not included in the one sub-pixel and the charged particles establishing complimentary color on the primary color, wherein potential between the first pixel electrode and the opposite electrode and between the second pixel electrode and the opposite electrode is controlled to display an image.

In addition, image display is configured by switching a state where the charged particles are assembled in the first opening; a state where the charged particles are assembled in the second opening; a state where the charged particles are assembled on the opposite electrode; and a state where the charged particles are diffused in the entire pixels.

In addition, a pixel region is a region surround by a plurality of signal lines and a plurality of scanning lines arranged so as to cross the signal lines; the pixel region has a plurality of memory devices and reference voltage lines connected to the memory devices respectively; drive waveform of voltage signals inputted to the reference voltage line has a period for rewriting image data and a period for retaining the image data; and the memory devices undergo refreshment simultaneously during the rewriting period to write brand new image data.

The present invention can realize an electrophoresis display device with high reflection index, high transmission rate and high contrast in a simple configuration.

Other objects, features and advantages of the invention will become apparent from the following description of the embodiments of the invention taken in conjunction with the accompanying drawings.

| Description of the Symbols | |
|---|---|
| 100 | electrophoresis ink |
| 101 | transparent substrate, |
| 102 | substrate |
| 103 | opposite electrode |
| 104 | lower electrode |
| 105 | upper electrode |
| 106 | opening |
| 106a, 106c | first opening |
| 106b, 106d | second opening |
| 107 | transmissive solvent |
| 108, 108a, 108b, 108c, 108d, 108e, 108f | charged particles |
| 109 | bulkhead |
| 110, 110a, 110b | insulating layer |
| 111 | unit cell |
| 112a, 1112b | sub-pixel |
| 113 | concave and convex layer |
| 114 | reflecting layer |
| 115 | transparent electrode layer |
| 116 | pixel |
| 117 | scanning line |
| 118, 118a, 118b | signal line |
| 119a, 119b | reference voltage line |
| 120, 120a, 120b | image signal memory |
| 121a, 121b, 121c, 121d | transistor |
| 122a, 122b | display device |
| 123 | scanning line drive circuit |
| 124 | signal line drive circuit |
| 125 | reference voltage line drive circuit |
| 126 | timing controller |
| 127 | display portion |
| 127 | panel portion |
| 129 | viewpoint |
| 131 | (m−1)th line selection period |
| 132 | m-th line selection period |
| 133 | (m+1)-the line selection period |
| 134 | gate pulse signal |
| 135 | rewrite period |
| 136 | retention period |
| 137 | refresh period |
| 138 | reset period |
| and 139 | write period. |

DETAILED DESCRIPTION OF THE INVENTION

With reference to FIG. 1 to FIG. 12, a first embodiment of the present invention will be described.

Figure 1:
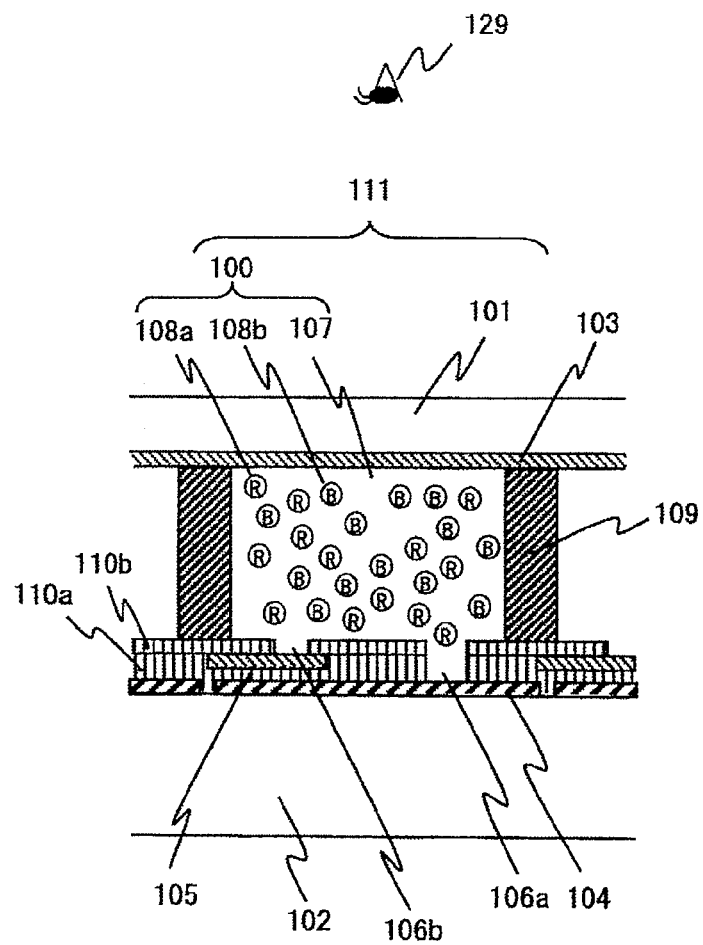
FIG. 1 is a section of a unit cell of an image display device related to the present invention.

FIG. 1 illustrates a section of a unit cell (unit pixel) 111 of an electrophoresis display device being an image display device. The unit cell 111 illustrates each of a plurality of pixel regions enclosed and divided by a plurality of bulkheads 109. The inside of the pixel region is charged with electrophoresis ink 100 being liquid. The liquid may be replaced by air. In the electrophoresis ink 100, two kinds of charged particles 108a and 108b different in charge performance are dispersed. As the two kinds of charged particles, here illustrated is the case of pigmentation particles being different in color. FIG. 1 illustrates the case of a positively charged red color (R) first particle 108a and a negatively charged blue color (B) second particle 108b.

The present embodiment includes a pair of substrates. Two electrodes (a lower electrode 104 being the first pixel electrode and an upper electrode 105 being a second pixel electrode arranged thereabove) are formed in a substrate 102 being one substrate of the pair of substrates. An opposite electrode 103 with transparent electrode material is formed on the side of a transparent substrate 101 being the other substrate arranged opposite to the foregoing substrate. There provided are a first insulating layer 110a formed between the lower electrode 104 and the upper electrode 105 and having a first opening 106a arranged on the lower electrode 104 and a first insulating portion, and a second insulating layer 110b formed between the upper electrode 105 and the electrophoresis ink 100 and having a second insulating portion and a second opening 106b. The respective electrodes of the upper electrode and lower electrode come into contact with the electrophoresis ink 100 in the first opening 106a and a second opening 106b provided in the insulating layer 110.

Control of potential difference generated by applying voltage between the opposite electrode 103 and the lower electrode 104 and between the opposite electrode 103 and the upper electrode 105 enables movement of the charged particles 108a and the charged particles 108b that have been electrically charged to change the display color of the unit cell 111 to display an image.

The specifics will be described below but potential difference between respective electrodes enables a plurality of charged particles to move and to change to the state of assembling in the first opening 106a, the state of assembling in the second opening 106b, the state of assembling on the side of the opposite electrode 103 and the state of being dispersed in the pixel range to execute image display.

Here, in the present embodiment, the opposite electrode 103 is common over the entire unit cells. The lower electrode 103 is arranged at least across the unit cell 111. The stick-shaped or comb-shaped upper electrode 105 is arranged.

Figure 2:
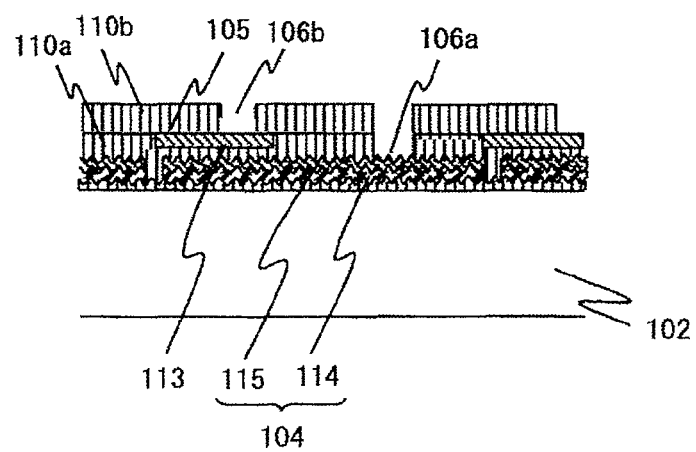
FIG. 2 is a section of detailed structure of the lower electrode and the upper electrode of a unit cell.

FIG. 2 illustrates an example of detailed structure of the lower electrode 104 and the upper electrode 105.

A concave and convex layer 113 having a fine concave and convex shape is formed on the substrate 102. A reflecting layer 114 and a transparent electrode layer 115 are formed on the concave and convex layer 113. Those reflecting layer 114 and transparent electrode layer 115 are combined to configure the lower electrode 104. Use of metal material with high reflection index for the reflecting layer 114 functions as a light diffuser layer in addition to the role of electrode. That is, the lower electrode 104 being the first pixel electrode will become a diffuse reflection electrode arranged to cover a plane in its entirety.

The reflecting layer 114 and the transparent electrode layer 115 have undergone etching in conformity to the size of the unit cell 111. Next, an insulating layer 110a is formed on the transparent electrode layer 115 and the upper electrode 105 is formed thereon with transparent electrode material. The upper electrode 105 has undergone etching into a predetermined shape to form, thereafter, the second insulating layer 110b. Lastly, the first opening 106a and the second opening 106b are formed collectively.

Use of transparent material for the first insulating layer 110a and the second insulating layer 110b causes incident light to diffuse and reflect at the reflecting layer 114 and reflects on the incident side.

Here, control of the shape of the concave and convex layer 113 enables a diffusion range of the reflecting light to be set into a desired range. Thereby it is possible to realize reflectance distribution and the like that is not so different in luminance regardless of the reflection percentage in the case of viewing the display device from the front side, that is, the diffusion state with high reflection gain and the viewpoint position.

As the first insulating layer 110a and the second insulating layer 110b, transparent inorganic film or organic film can be used. As the inorganic film, compounds selected from the group consisting of $SiO_2$, $Si_3N_4$, $Al_2O_3$, MgF and the like are useable. In the case of using organic film, the property of the electrophoresis ink 100 occasionally changes. In that case, the side in contact to the electrophoresis ink 100 is desirably inorganic film. For example, it is desirable that the first insulating layer 110a is formed of organic film and the second insulating layer 110b is formed of inorganic film.

As the reflecting layer 114, metal with high reflection percentage is desirable. Metal material selected from the group consisting of Al, Ag, Cr, Mo, Au, Ni, Cu and the like can be used singly or in a complex state. In the state where a metal electrode and the electrophoresis ink 100 are brought into direct contact, the property of the electrophoresis ink 100 occasionally fluctuates. Here the stable transparent electrode layer 115 was stacked onto the electrophoresis ink 100 to come into contact to the electrophoresis ink 100. Thus, the lower electrode 104 being the first pixel electrode is multi-layered so that the reflecting layer 114 is caused to have light reflecting function and the transparent electrode layer 115 is caused to have stability against the electrophoresis ink 100 and function of improving the electric property with the electrophoresis ink 100. Thereby functions are split and the property and the stability of the display device were improved.

For that purpose, as the transparent electrode layer 115, metal film with good stability against the electrophoresis ink 100 and good electric property with the electrophoresis ink 100 that has been formed thin to such an extent to allow light to transmit may be used. Otherwise, in the case where the reflecting layer 114 itself has good stability against the electrophoresis ink 100 and good electric property with the electrophoresis ink 100, there is no need to provide the transparent electrode layer 115.

Transparent electrode material having good stability against the electrophoresis ink 100 and good electric property with the electrophoresis ink 100 is used for the upper electrode 105 being the second pixel electrode, which was used in a single layer state without adopting stacked structure as the lower electrode 104. The light having transmitted through the transparent upper electrode 105 undergoes diffusion and reflection at the reflecting layer 114 and returns to the side of the viewpoint 129 (see FIG. 1). Metal material with high reflection index can be used for the upper electrode 105. In that case, the upper electrode 105 is desired to form a concave and convex shape and to have light diffusion property likewise the reflecting layer 114. In the case where the first insulating layer 110a is sufficiently thin, a concave and convex shape is formed in the upper electrode 105 as well in conformity to the concave and convex of the concave and convex layer 113. In addition, likewise the lower electrode 104, the upper electrode 105 may be structured into a multi-layer so as to split functions.

Thus, use of electroconductive material reflecting visible light for the lower electrode 104 will cause that portion to function also as the reflecting layer to obtain a high definition compliant display device with less parallax difference. In addition, displaying white with a light diffusion layer, the light diffusion direction can be controlled more than in the case of the conventional display device of displaying white with white particles to enable bright display.

However, the light diffusion function does not necessarily have to be provided in the light reflecting layer but, for example, a transmissive and concave and convex layer different from the transmissive solvent 107 in refractive index may be provided on the second insulating layer 110b or on the lower electrode 104. Otherwise, a transparent concave and convex layer may be provided on the side of the viewpoint 129 of the substrate 101 (the transparent concave and convex layer to be provided on the side opposite to the side where the opposite electrode 103 is arranged with respect to the substrate 101), or on the side where the opposite electrode 103 is arranged with respect to the substrate 101 to cause light to diffuse by refraction. Or otherwise, light diffusion property may be provided by causing transmissive particles different in refractive index in the insulating layer 110 to undergo diffusion in the insulating layer 110.

In addition, in the case of using an image display device of the resent embodiment as a transmission type, there is no need to use the reflecting layer 114 but the lower electrode 104 may be configured only with the transparent electrode layer 115.

As the transparent material for the transparent electrode layer 115, ITO (Indium Tin Oxide), IZO (Indium Zinc Oxide), ITZO, $SnO_2$ and the like are usable.

As the substrate material used for the transparent substrate 101 and the substrate 102, in addition to glass, a substrate made of plastic such as polyethylene terephthalate (PET), polycarbonate (PC), polyether sulfone (PES), polyimide (PI) and the like can be used. For the reflection-type display device that does not have to be transmissive, a metal substrate such as stainless, iron-nickel alloy and the like can be used as the substrate 102. In the case of using a metal substrate, resin coating is desirable in order to improve chemical resistance in the case of forming a TFT (Thin Film Transistor).

In the case where a flexible substrate such as a plastic substrate, a metal substrate and the like is used for the both of the transparent substrate 101 and the substrate 102, a flexible image display device can be provided. In addition, a substrate such as a plastic substrate, a metal substrate or thin glass can be used to configure a thin image display device.

Material for the bulkhead 109 can be formed by a technique such as photolithography, etching, heat deforming of thrust into a mold and the like taking advantage of the photosensitive property on organic material such as polyvinyl cinnamate, azide novolac resin, styrene polymer, methacrylate polymer, acryl resin, cardo polymer, fluorine resin and the like and transmissive inorganic material.

In the case where the organic material is used for the bulkhead 109 and is brought into contact to the electrophoresis ink, the property of the electrophoresis ink may fluctuates. In that case, the bulkhead 109 with the organic material is desirably formed so as to be covered by inorganic film. In the case where inorganic film is used as the insulating layer 110, the insulating layer 110 is formed after the bulkhead is formed and thereby the insulating layer 110 can also be used for coating on the bulkhead 109.

The bulkhead 109 is desirable to be in tight contact to the transparent substrate 101. However, it may be sufficient for the changed particles 108 not to move to and from the adjacent pixel allowed to move to and from the adjacent pixel. Therefore, spacing of around the particle diameter will not give rise to a problem.

Drive of the charged particle 108a and the charged particle 108b being different in color and the displayed color will be described with reference to FIGS. 3A to 3D.

Basically, based on the polarity of voltage applied to the first pixel electrode, the second pixel electrode and the opposite electrode, the pigmented charged particles 108 charged to either positive or negative in the electrophoresis ink 100 are diffused in the electrophoresis ink and are concentrated into the opposite electrode 103, the first opening 106a and the second opening 106b to represent various colors to display an image. Specifics will be described below.

Figure 3A:
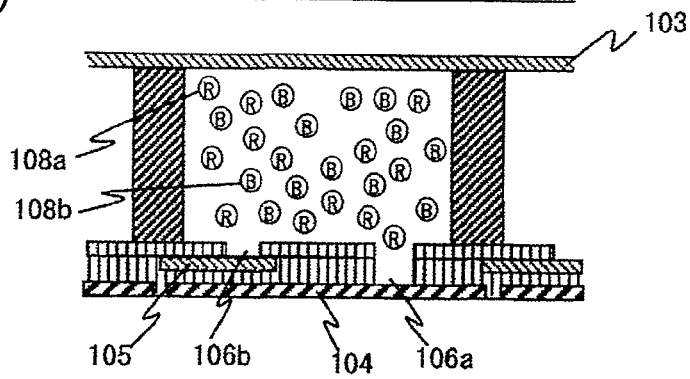
FIG. 3A to FIG. 3D are explanatory diagrams illustrating drive and display of a unit cell of an image display device related to the present invention.

Here, the opposite electrode 103 is provided with common voltage. Voltage of the lower electrode 104 and the upper electrode 105 being the other two electrodes is caused to change with respect to the common voltage to cause the charged particles 108a and the charged particles 108b to move. Firstly, in the case where the lower electrode 104 and the upper electrode 105 are both set to the common voltage same as the opposite electrode, the charged particles 108a and the charged particles 108b are diffused in the transmissive solvent 107 in a mixed state (FIG. 3A). Here, the red color is adopted as the charged particles 108a and the blue color is adapted as the charged particles 108b, resulting in the black color in a mixed state thereof.

Figure 3B:
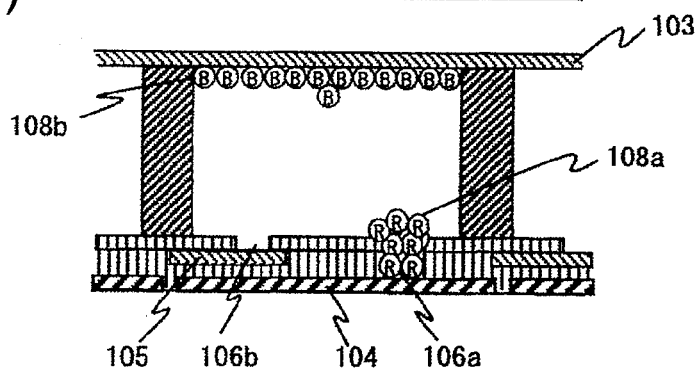

Next, applying the negative voltage to the lower electrode 104 to set the upper electrode 105 to the common voltage or to the negative voltage slightly lower than the lower electrode 104, the positively charged red charged particles 108a are assembled in the first opening 106a provided in the lower electrode 104 so that the negatively charged blue charged particles 108b are assembled on the side of the opposite electrode 103 (FIG. 3B). At that occasion, mainly the blue color charged particles 108b will become visible from the viewpoint 129. Therefore, that unit cell 111 will display the blue color.

Figure 3C:
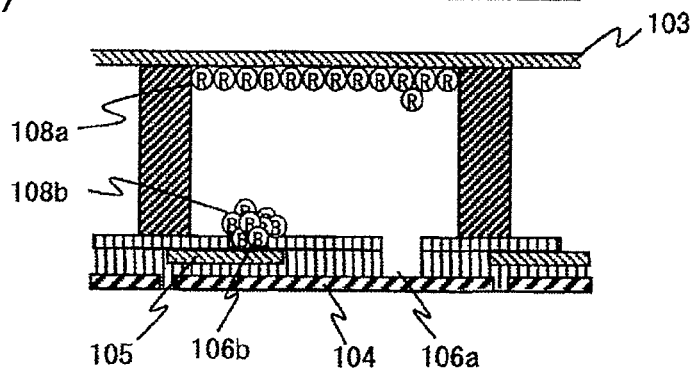

On the contrary, applying the positive voltage to the upper electrode 105 to set the lower electrode 104 to the common voltage or to the positive voltage slightly higher than the upper electrode 105, the negatively charged blue charged particles 108b are assembled in the second opening 106b provided in the upper electrode 105 so that the positively charged red charged particles 108a are assembled on the side of the opposite electrode 103 (FIG. 3C). At that occasion, mainly the red color charged particles 108a will become visible from the viewpoint 129. Therefore, that unit cell 111 will display the red color.

Figure 3D:
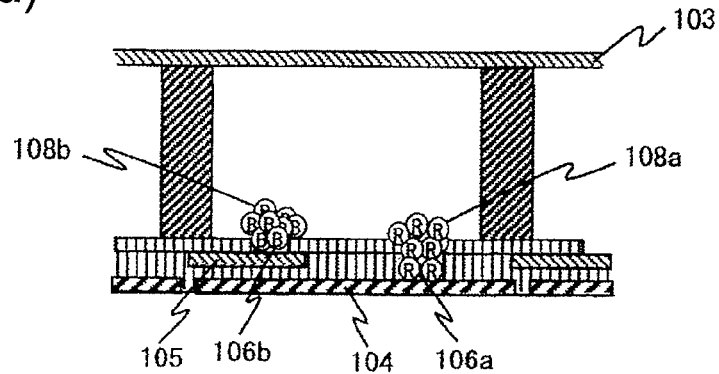

Moreover, applying the negative voltage to the lower electrode 104 and the positive voltage to the upper electrode 105, the red charged particles 108a are assembled in the first opening 106a provided in the lower electrode 104 and the blue charged particles 108b are assembled in the second opening 106b provided in the upper electrode 105 (FIG. 3D). In that case, the lower electrode 104 is visible from the viewpoint 129 and, therefore, it looks white due to the light diffusion property of the lower electrode 104.

In the case where the adhesion of the charged particles 108 is weak, with the lower electrode 104 or the upper electrode 105 being set to common voltage, the charged particles 108 assembled in the first opening 106a and the second opening 106b disperse in the transmissive solvent 107 by the electrostatic repulsion between the charged particles 108. Thus, prior to setting the lower electrode 104 or the upper electrode 105 to the common voltage, tentatively applying the reverse voltage and then setting to the reference voltage, diffusion of the charged particles 108 assembled in the first opening 106a or the second opening 106b is accelerated to make response faster. In addition, in the case where adhesion of the charged particles 108 is too strong to diffuse the particles 108 only by setting the lower electrode 104 and the upper electrode 105 to the common voltage, the operation of setting to the common voltage is carried out after tentatively applying the reverse voltage to the lower electrode 104 or the upper electrode 105 to make the charged particles 108 depart from the opening 106, the charged particles 108 can be made to get diffused in the transmissive solvent 107.

In order to form an electric field distribution so that the charged particles 108 are assembled in the opening 106, the dielectric constant of the insulating layer 110 is desired to be smaller than dielectric constant of the transmissive solvent 107. However, even though the dielectric constant does not necessarily have to fulfill that relation, it has already been confirmed experimentally that the charged particles 108 are assembled in the opening 106. It is presumed that ions in the transmissive solvent 107 move prior to the particles to weaken the electric field on the insulating layer 110 or electrohydrodynamic convection occurs in the transmissive solvent 107 with the exposed electrode of the opening 106 being the center so that that convection causes the charged particles 108 to move.

The transmissive solvent 107 is desirably highly insulating and not reactive to resin and pigment and any one selected from the group consisting of xylene, toluene, silicon oil, isoparaffin, liquid paraffin, organic chloride, various types of carbon hydride, various types of aromatic carbon hydride and the like can be used and may be used individually or in a prepared state. From the aspect of light utilizing efficiency, the one with high transmission rate is preferable; from the aspect of the length of life, the one with high insulating property not to produce ions at the occasion of voltage application is preferable; and from the aspect of mobility speed, the one with low viscosity is preferable.

As color material of the charged particle 108, various colors selected from the group consisting of various types of inorganic pigment, organic pigment, dye undissolvable to solvent and the like can be selected. Those being not dissolved in the transmissive solvent 107 are preferable but the color material will not be limited thereto if it can be used for image display. As inorganic pigment, carbon black, titanium oxide, zinc flower, zinc oxide, tripon, iron oxide, aluminum oxide, silicon dioxide, kaolinite, montmorillonite, talc, barium sulfate, calcium carbonate, silica, alumina, cadmium red, colcothar, molybdenum red, lead chromate molybdate, molybdenum orange, chrome yellow, chrome yellow, cadmium yellow, yellow iron oxide, titan yellow, chrome oxide, viridian, cobalt green, titan cobalt green, cobalt chrome green, ultramarine blue, iron blue, cobalt blue, cerulean blue, manganese violet, cobalt violet, mica and the like, for example, are nominated. As organic pigment, pigments such as azo type, azomethyl type, polyazo type, phthalocyanine type, quinacridone type, anthraquinone type, indigo type, thioindigo type, quinophthalone type, benz-imidazolone type, isoindoline type, isoindolinon type and the like, for example, are nominated. As dye not dissolved in solvent, azo type, anthraquinones type, indigo type, phthalocyanine type, carbonyl type, quinonimine type, methane type, quinoline type, nitro system and the like, for example, are nominated and disperse dye is preferable in particular among them. For example, as an example of pigment, there usable are benz-imidazolone type as yellow organic pigment, quinacridone type and carmine type as magenta organic pigment and copper phthalocyanine type as cyan organic pigment.

Moreover, coating the pigment with resin can improve the dispersion property and improve chargeability and stability of particles. As resin material, polymer compounds of acrylic type, polyester type, polyurethane type, epoxy type, amino type and the like are nominated. Those polymer compounds can be used individually or mixture of two or more kinds thereof can be used in a combined fashion.

Among the charged particles 108 having undergone coating with resin, some get charged naturally in the solvent due to dissociation of polarity group on the particle surface and ion implantation to the polymer particles or addition of surfactant and charge controlling agent to the solvent can make the particles 108 get charged. As the additive thereof, a generally known one selected from the group consisting of anionic surfactant, cationic surfactant, nonionic surfactant, skinning preventive agent, leveling agent, metal soap, lecithin and the like can be used but the additive will not be limited thereto in particular.

The particle diameter of the charged particles 108 is desired to be not less than 0.05 µm and not more than 10 µm in consideration of the movement speed of electrophoresis in the solvent and resolution of display. Use of the charged particles 108 with a small diameter can make the cell gap of the unit cell 111 small and, therefore, can also make the area of the unit cell 111 small, enabling high resolution. The cell gap t is desirably not larger than the unit cell size R and desirably not larger than R/4. In addition, the particle diameter D needs to be sufficiently smaller than the cell gap t and desirably not less than t/5 and not more than t/200 and more preferably not less than t/10 and not more than t/100. For example, in the case of the unit cell 111 being 100 ppi, the unit cell size R is 42 µm and, therefore, the cell gap is desired to be not more than 42 µm and preferably not more than 10 µm. Moreover, in the case of the cell gap of 10 µm, the particles with the particle diameter of not less than 0.05 µm and not more than 2 µm and more preferably not less than 0.1 µm and not more than 1 µm are desirably used. In addition, on the other hand, use of the charged particles 108 with a large diameter makes the adhesion to operate between the charged particles 108 themselves and the charged particles 108 and the wall surface such as the electrode face and the like larger than the diffusion force generated by Brownian movement so that the particles assembled in an electrode is desirably apt to express memory properties to cause the particles to remain in an assembled fashion without being scattered after the voltage is cut off. In order to express memory properties, it is desired to use particles with the particle diameter not less than 0.5 µm and more preferably not less than 1 µm.

As described above, in the present embodiment, three electrodes of the opposite electrode 103, the lower electrode 104 and the upper electrode 105 and two kinds of particles different in chargeability and color enable a single unit cell 111 to display four colors of black, white, the first particle color (red) and the second particle color (blue). Moreover, controlling the assembly state in the opening 106 of the charged particles 108, intermediate colors of those four colors may be formed to express tone. That assembly state to the opening 106 of the charged particles 108 can be controlled by the applied voltage or the sequence of the applied voltage. Or otherwise, display of the unit cell 111 is carried by four colors so as to enable display of tone by area tone in combination with the ambient unit cells 111. In the case of using area tone, providing large cells and small cells without setting the size of a unit cell constant, the number of tone that can be displayed in combination thereof may be made large.

The combination of the two kinds of charged particles will not be limited to red and blue but the combination providing with black will be satisfactory. The combination among three primary colors in addition mixture of red, green and blue, or the combination of red, green and blue being primary colors in addition mixture and the cyan, yellow and magenta (the three primary colors in subtraction mixture) being complimentary color thereon or the combination making light absorption rate large across the visible wavelength range in the state where the other two charged particles are mixed will be preferable. In addition, the state where the two kinds of charged particles are mixed will not be limited to black but a pigmented state will be preferable as well. In that case, the colors of the charged particles are preferably combined to in conformity of the display color. Those colors that are substantially recognizable are preferable. For example, black may be deep blue. In order to mix colors by mixing charged particles 108, memory property of the charged particles 108 to adhere to the electrode is desirably weak. With the lower electrode 104 or the upper electrode 105 being set to common voltage, the charged particles 108 that were assembled in the first opening 106a, the second opening 106b or the opposite electrode 103 are desirably dispersed by mutual electrostatic repulsion among the particles. In addition, with the first opening 106a and the second opening 106b being set to common voltage, the charged particles 108 that were assembled in the opposite electrode 103 are desirably dispersed by mutual electrostatic repulsion among the particles. In the case where the charged particles 108 are transmissive, the memory property may be present since color mixture with the other particles having dispersed in the transmissive solvent 107 through the charged particles 108 can be color mixture performed. In the case where the memory property is thus present, black color appearance or density occasionally varies due to whether the first charged particles are set to the side of viewpoint 129 or the second charged particles are set to the viewpoint 129 and that difference can be used for tone display.

In addition, in the reflective image display device, transmissive particles and nontransmissive particles are both usable as charged particle 108. However, with transmissive particles, light having transmitted through the transmissive particles get reflected by the reflecting layer 114 to return at the time when that color is displayed, being advantageous, therefore, in that bright display is apt to be easily obtainable. In the case of adopting a transmission type image display device, transmissive particles are preferably used as charged particle 108. In addition, moreover, the insulating layer 110 is not necessarily transparent but may be pigmented so that the insulating layer 110 can be used as a color filter. In addition, in order to adjust the color appearance of display, the insulating layer 110 may be lightly pigmented. Otherwise, a fluorescent pigment may be mixed in the insulating layer 110 to absorb ultraviolet to emit fluorescence.

Figure 4:
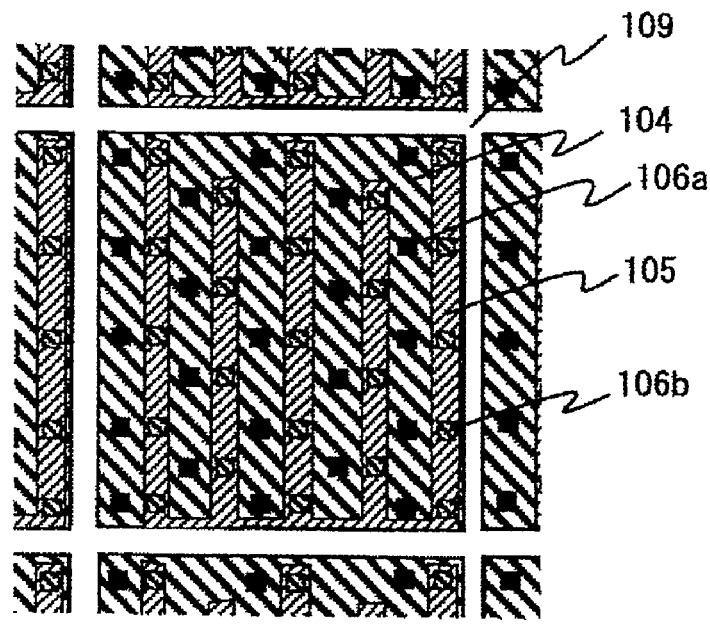
FIG. 4 is a plan view of a unit cell of an image display device related to the present invention.

FIG. 4 illustrates an example of plan view of a unit cell 111.

The unit cell 111 is approximately quadrate and is provided with a plurality of first openings 106a and second openings 106b therein. Thus, providing, in plurality, the first opening 106a in the first insulating layer 110a and the second opening 106b in the second insulating layer 110b, the movement distance of the charged particles 108 can be made short so as to enable response speed faster. In the image display device of the present embodiment, the response time at the occasion of switching images is determined by movement distance of the particles 108. Specifically, that response time depends on the movement distance of the particles 108 which becomes the longest inside the unit cell 111. The distance between the opening 106 and the middle position in the opening 106 on the opposite electrode 103 will become the longest particle movement distance L. That longest particle movement distance L will follow the following expression with the spacing d between the homogeneous openings 106 and the cell gap t.

$$L = \{t^2 + (d/2)^2\}^{1/2} \quad (1)$$

Here, as for the response time T fulfills the following relation with the longest particle movement distance L and the drive voltage V.

$$T \propto L^2/V \quad (2)$$

That is, with a constant drive voltage, the response time T gets larger in proportion to the square of the longest particle movement distance L. Thus, it is desired to arrange the first opening 106a and the second opening 1060b respectively so that the longest particle movement distance L gets short.

For that purpose, as shown in FIG. 4, the adjacent homogeneous openings 106 (the first opening 106a or the second opening 106b) are desirably arranged approximately at the top of the regular hexagon. In addition, the aperture ratio of the opening 106 (percentage of the area occupied by the opening 106 to the effective area of the unit cell 111) is set to a desired value to increase the number of the opening 106, the movement distance of the charged particle 108 is shortened to enable the response speed faster. In addition, the aperture ratio of the entire opening 106 is desired to be smaller so as to expand the area of the reflecting layer 114 exposed in the case of collecting the particles in the opening 106, enabling bright display. However, density of the charged particles 108 sets an upper limit to the effective aperture ratio. Larger expansion of the aperture ratio is not effective. The aperture ratio of the opening 106 is desired to be 5 to 40%, more preferably 10 to 20%. The particle density is set in conformity to the luminance, the contrast and the cell gap of the image display device and is desired to be set to approximately 1 wt % to 20 wt %, preferably 2 wt % to 10 wt %.

The upper electrode 105 is arranged so as to bring the second opening 106b into connection. FIG. 4 illustrates the case where the upper electrode 105 is formed to shape a comb. On the other hand, the lower electrode 104 is arranged to cover the entire unit cell 111, that is, the entire pixel. The lower electrode 104 having the reflecting function is arranged to cover the entire cell 111 and, therefore, can increase the reflecting ratio at the time of displaying white.

Figure 5:
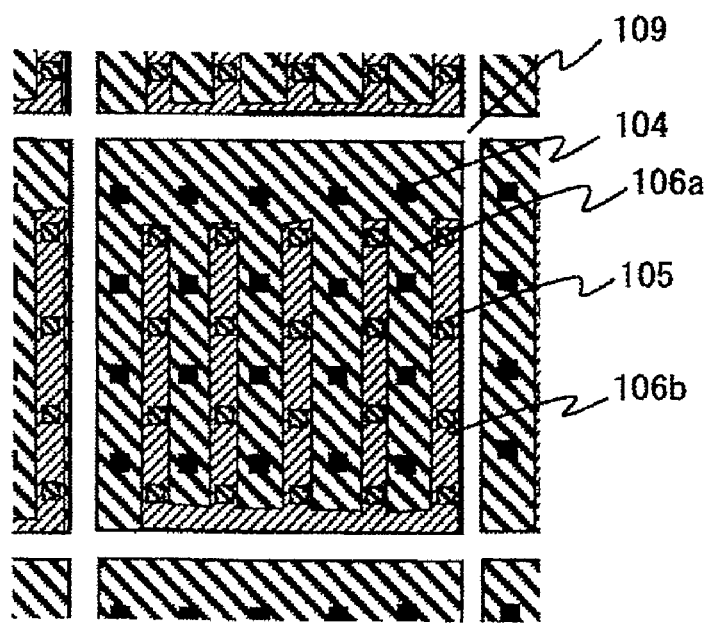
FIG. 5 is another plan view of a unit cell of an image display device related to the present invention.

FIG. 5 illustrates another example of the plan view of the unit cell 111.

Here, the first opening 106a and the second opening 106b are arranged in the position of the vertex of the square and the other opening 106 is arranged in the centers of the mutually formed respective squares. In that case, the openings 106 where different particles are assembled can be arranged mutually apart so as to enable decrease in cross-talk where the particles are overlapped in the case of collecting the particles in the both openings 106 (white display).

In FIG. 4 and FIG. 5, the shape of the opening 106 is illustrated by a square but will not be limited to a square. Circular shape, polygon such as hexagon or a star shape may be adopted. In the case of adopting the star shape, it is desired to arrange the protrusion in such a direction to shorten the movement distance of the charged particle 108.

Figure 6:
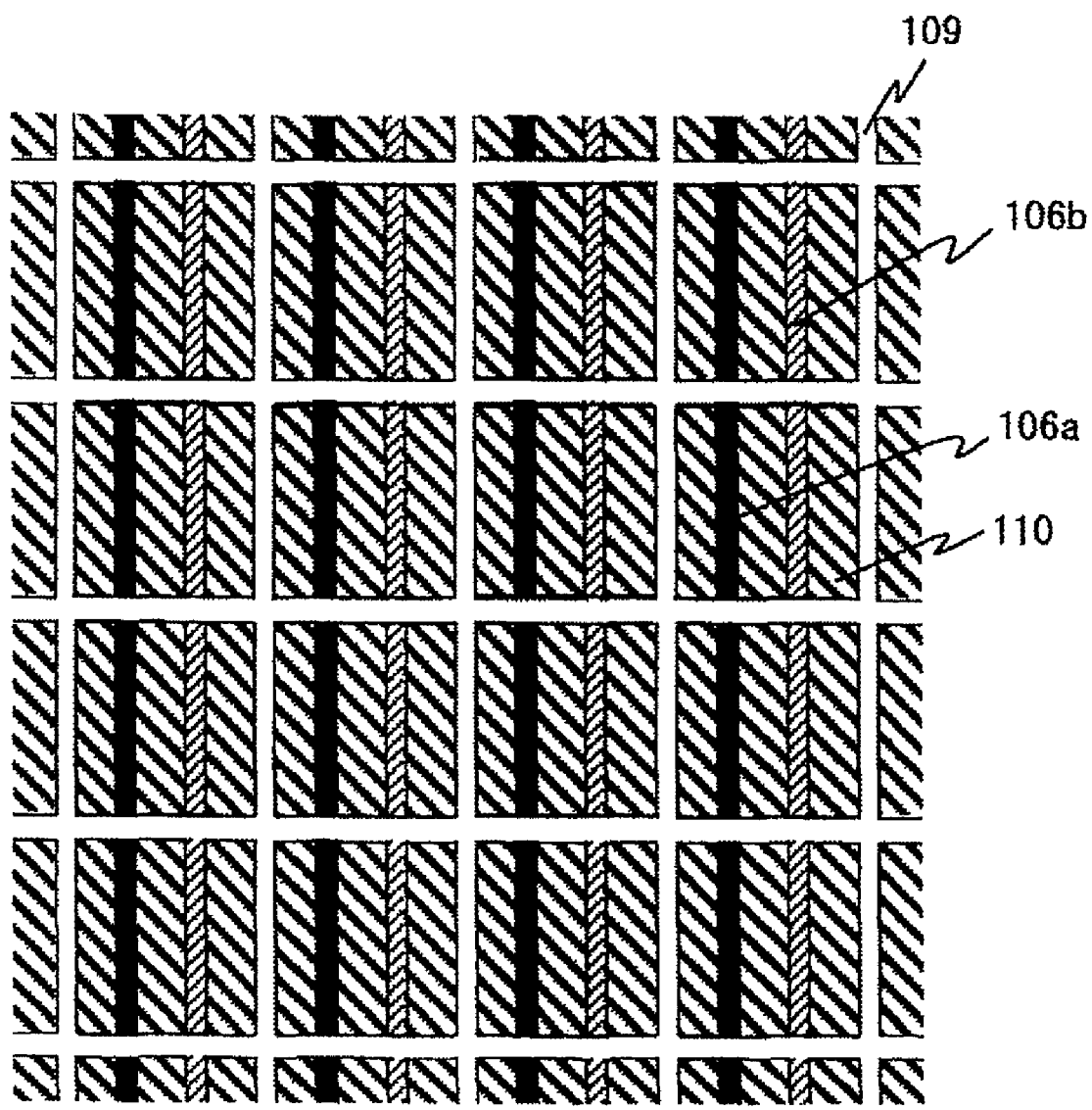
FIG. 6 is still another plan view of a unit cell of an image display device related to the present invention.

FIG. 6 further illustrates another example of a plan view of still another unit cell 111.

Here, the opening 106 was formed in a stripe shape. The first opening 106a and the second opening 106b were arranged with a single stripe respectively. The first opening 106a and the second opening 106b may be provided in plurality. The stripe electrode structure of the present embodiment is simple in structure and is produced easily. On the other hand, as in FIG. 4 and FIG. 5, in the case where the opening 106 is provided in a dot shape, it is possible to make the aperture ratio of the opening 106 limited by the minimum process line width at the time of predicting the opening larger than the stripe structure to enable an increase in the reflecting ratio.

Thickness of the insulating layer 110 is preferably thickness providing with sufficient insulating properties between the lower electrode 104 and the upper electrode 105 and between the upper electrode 105 and the electrophoresis ink 100. However, setting the thickness of the insulating layer 110 to twice larger, preferably 5 times larger, than the particle diameter, the particles in the particle assembled state are housed in the opening 106 to enable decrease in the number of particle 108 lacking out of the opening 106 and can make the substantial aperture ratio large, enabling the reflecting ratio and contrast proportion to get intensified.

Moreover, when reflecting electrode and reflecting film are provided also on the side of the opening 106, the light beam entering the side of the opening 106 from the outside of the opening 106 is also reflected effectively in the state of assembled charged particles 108 and the reflecting ratio can be suitably increased on the light beam having entered diagonally in particular. In addition, the electrode portion may be exposed from the opening 106 to the upper side of the insulating layer 110. In that case, electric field distribution to cause the charged particles 108 to assemble to the opening 106 more intensively is formed to enable the response speed faster.

Figure 7:
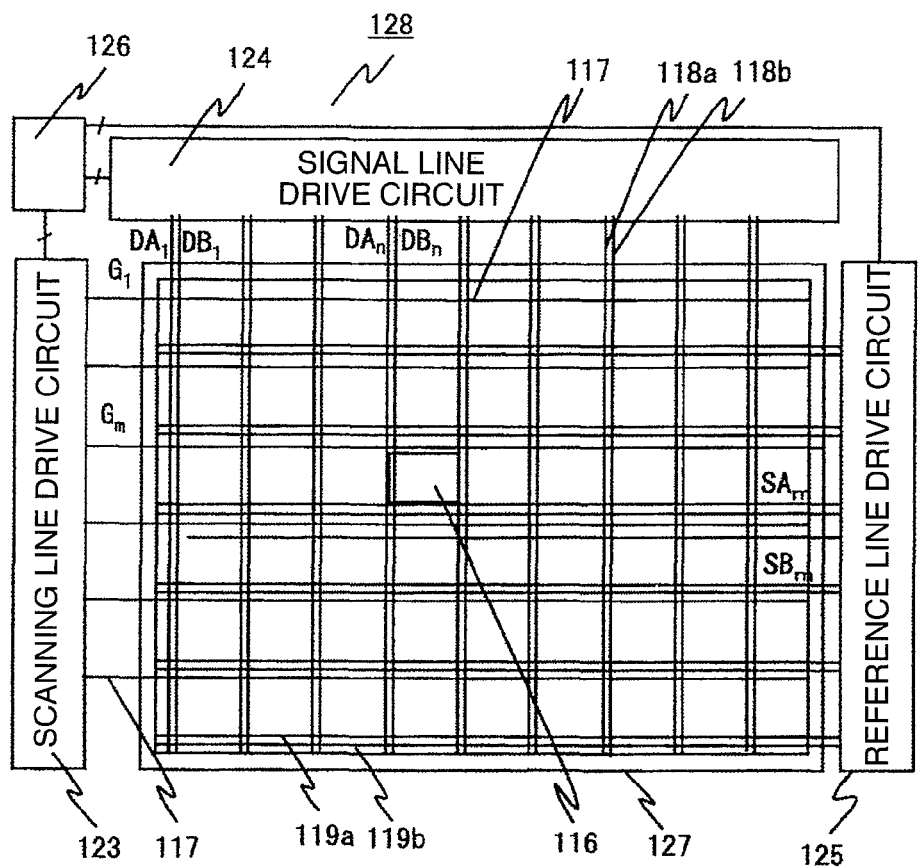
FIG. 7 illustrates an example of a drive circuit of an image display device related to the present invention.

FIG. 7 illustrates a block diagram of an image display apparatus of the present invention embodiment. The image display device comprises a panel portion 128 having a so-called active matrix substrate comprising a display portion 127 including a plurality of pixels 116 arranged to shape a matrix; a scanning line drive circuit 123 for driving the scanning line 117; a reference voltage line drive circuit 125 for driving a reference voltage line 119a and a reference voltage line 119b in synchronization with the scanning line drive circuit 123; a timing controller 126 and a signal line drive circuit 124 for driving signal lines 118a and 118b. The panel portion 128 controls the respective pixels 116 electrically and independently and thereby can display any image. Here, the pixel 116 refers to a region surrounded by the signal lines and the scanning lines in the present embodiment.

The timing signals and the image signals from an apparatus comprising the image display apparatus of the present invention are inputted to the timing controller 126. The timing controller 126 controls the signal line drive circuit 124, the scanning line drive circuit 123 and the reference voltage line drive circuit 125. The control circuits such as the signal line drive circuit 124, the timing controller 126 and the like are provided separately in addition to the display portion 127 but may be formed directly in the display portion 127.

Figure 8:
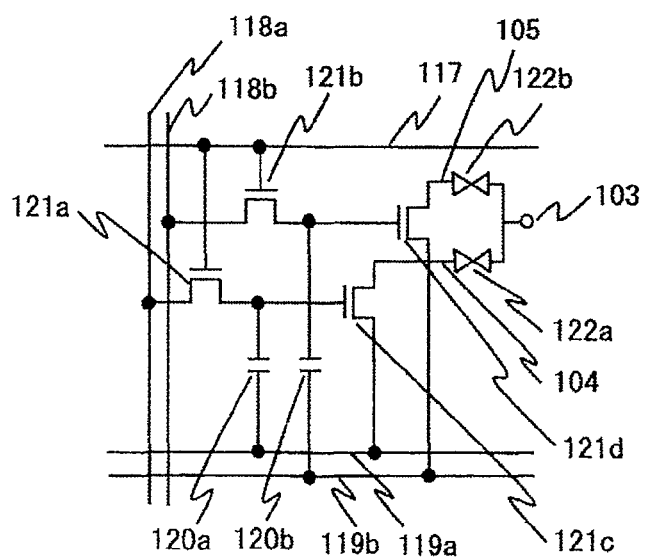
FIG. 8 illustrates an example of a detailed circuit of a pixel inside a drive circuit.

FIG. 8 illustrates an example of a circuit configuration of the pixel 116.

The region of the pixel 116 is a region surrounded by a plurality of signal lines 118 and a plurality of scanning lines 117 wired by crossing the a plurality of signal lines and is configured to provide the interior of the pixel region, a plurality of memory devices and the reference voltage line connected to those memory device respectively.

Specifically, as for the transistor 121a and the transistor 121b, the gates are connected to the scanning line 117 and either the drain or the source is connected to the signal line 118a and the signal line 118b respectively. The other drain or source is connected to the image signal memory 120a of the first memory device and the image signal memory 120b of the second memory device and moreover to the gate of the transistor 121c and the transistor 121d respectively. Either the drain or the source of the transistor 121c and the transistor 121d is connected to the reference voltage line 119a and the reference voltage line 119b respectively. The other drain or source is connected to the lower electrode 104 and the upper electrode 105. The opposite electrode 103 is provided to oppose the lower electrode 104 and the upper electrode 105. The lower electrode 104 and the upper electrode 105 are respectively connected to the display devices 122a and 122b. Here, the voltage of the opposite electrode 103 is set constant to be the common voltage. The image signal memory 120a of the first memory device stores the voltage to be applied to the lower electrode 104 and the image signal memory 120b of the second memory device stores the voltage to be applied to the upper electrode 105.

A thin film transistor (TFT: Thin Film Transistor) was used as a transistor being a drive device. As a TFT, amorphous silicon TFT and a polysilicon TFT are usable. Otherwise an organic TFT with organic semiconductor is also usable.

With reference to FIG. 9 to FIG. 12, a method of driving the image display device will be described.

Figure 9:
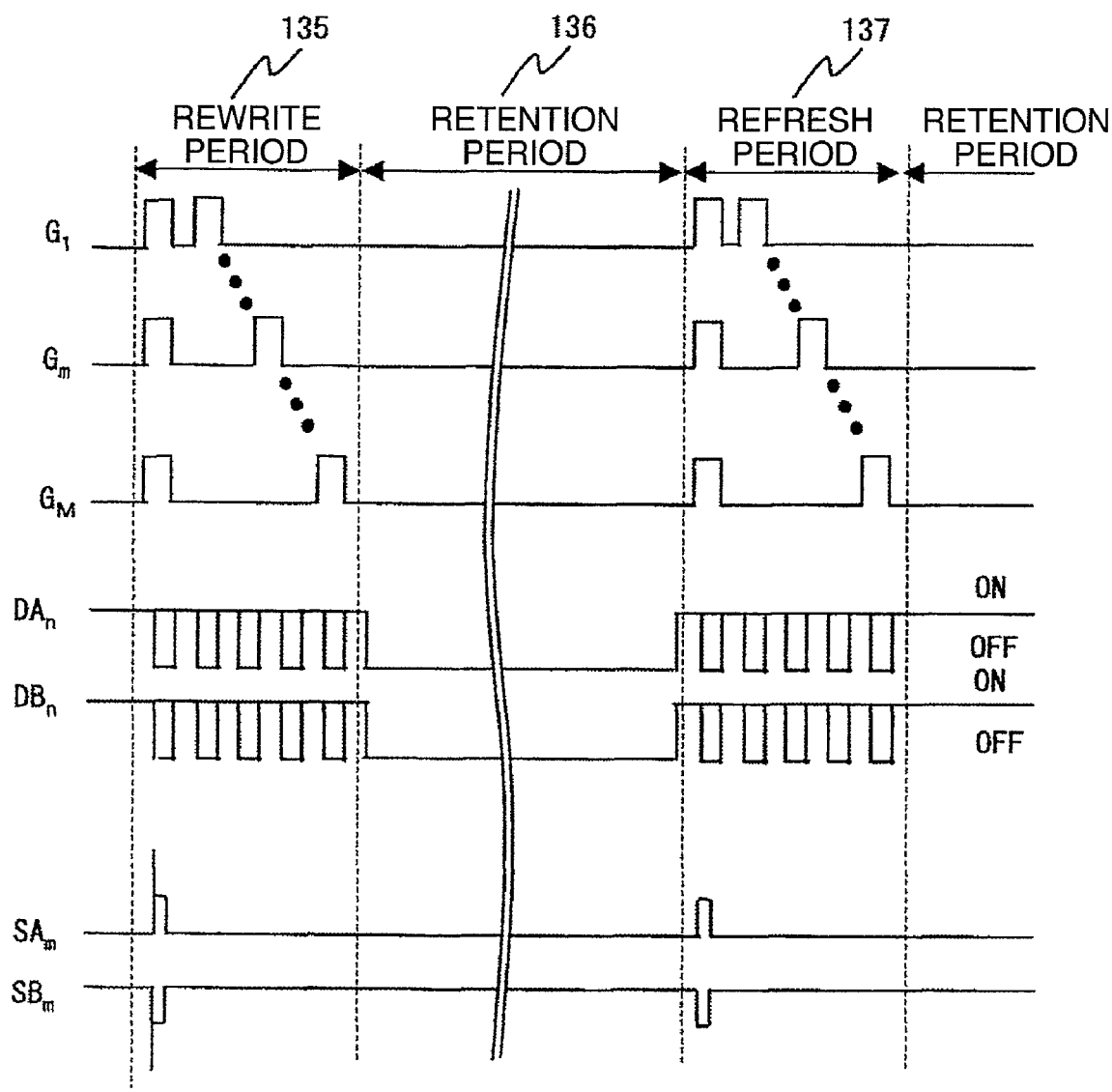
FIG. 9 illustrates an example of a drive sequence of an image display device related to the present invention.

FIG. 9 illustrates the entire drive sequence. For the drive method illustrated here, the drive waveform (potential) of the voltage signal inputted to the reference voltage line is divided into an image data rewrite period 135, a retention period 136 retaining the image data thereof and a refresh period 137.

FIG. 9 illustrates in the case of FIG. 7 where a top scanning line 117 is expressed with $G_1$ and the subsequent lines are numbered in order and the leftist signal line 118a is expressed with $DA_1$ and the signal line 118b is expressed with $DA_2$ and the subsequent lines are numbered in order to drive the pixel controlled by the m-th scanning line 117 ($G_m$) and the n-th signal line 118 ($DA_n$ and $DB_n$), and illustrates waveforms ($G_1$, $G_m$, $G_M$) of the first, m-th and M-th scanning line 117, waveforms ($DA_n$, $DB_n$) of two n-th signal lines 118 and waveforms ($SA_m$, $SB_m$) of two m-th reference voltage line 119. Corresponding with FIG. 8, Gm corresponds with the drive waveform of the scanning line 117, $DA_n$ and $DB_n$ respectively correspond with the drive waveform of the signal line 118a and the signal line 118b, and $SA_m$ and $SB_m$ respectively correspond with the drive waveform of the reference voltage line 119a and the reference voltage line 119b. During the rewrite period 135, the state of the image signal memory 120 is updated, that is, the display image information is updated. During the refresh period 137, the display image information retained in the image signal memory 120 is refreshed. That is, during the rewrite period 135, the image signal memory being a plurality of memory devices are refreshed at the same time. Thereafter, new image data is written. On the other hand, the retention period 136 is a period for halting the scanning operation on the screen to retain the display state on each pixel determined corresponding with the state of the image signal memory. The length of the retention period 136 is determined by the retention time of voltage of the image signal memory 120 and the refresh period 137 is inserted before getting down to equal or below the off-voltage of the transistor. During the period of an image to undergo no rewrite, the refresh period 137 and the retention period 136 are repeated. The retention period 136 causes the scanning line to stop scanning so that the reference voltage line 119a retains the state where −VG is applied and the reference voltage line 119b retains the state where +VG is applied. Therefore, the waveform during the rewrite period 135 and during the refresh period 137 will be described below.

Figure 10:
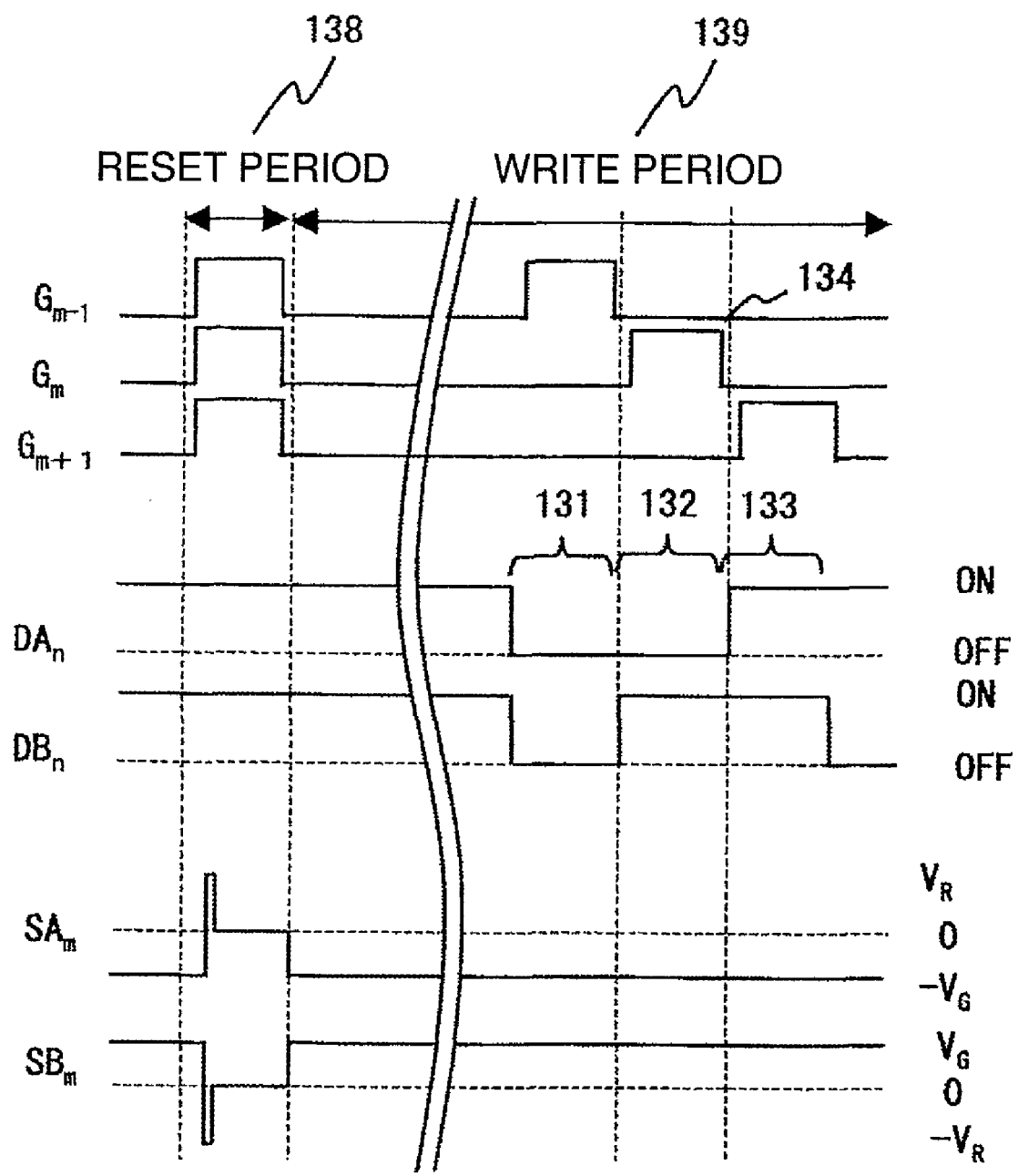
FIG. 10 illustrates a diagram describing an example of a drive sequence for a rewrite period.

FIG. 10 illustrates a drive sequence of the rewrite period 135 of implementing rewrite in the image signal memory 120.

The signal line 118 undergoes voltage control corresponding with the gate pulse signal 134 of each of the scanning lines 117. The rewrite period 135 is divided into two periods of the first reset period 138 and the subsequent image signal write period 139. During the reset period 138, the gate pulse signal 134 is applied to all the scanning lines 117 to put ON the transistors 121a and the transistors 121b of all the pixels. In addition, the signal line 118a and the signal line 118b are set to potential enough to put ON the transistor 121c and the transistor 121d. When the transistor 121c and the transistor 121d are put ON, voltage of the reference voltage line 119a is applied to the lower electrode 104 and voltage of the reference voltage line 119b is applied to the upper electrode 105. At first, reverse voltage (+VR for the lower electrode 104 and −VR for the upper electrode 105 with VR being reset voltage) of causing the charged particles 108 to depart from the first opening 106a and the second opening 106b respectively provided thereto is applied to the lower electrode 104 and the upper electrode 105, and in the case where the charged particles 108 having been assembled in the first opening 106a and the second opening 106b are present, the force to depart from the first opening 106a and the second opening 106b is applied to those particles. Subsequently, the voltage of the lower electrode 104 and the upper electrode 105 will become the common potential (being 0 V here). The charged particles 108 having departed from the first opening 106a and the second opening 106b are dispersed in the transmissive solvent 107 in receipt of the mutual electrostatic repulsion. After the gate pulse signal 134 is put OFF, potential of the reference voltage line 119a and the reference voltage line 119b will be the drive voltage $V_G$ (−$V_G$ for the reference voltage line 119a and +$V_G$ for the reference voltage line 119a) for collecting particles to the first opening 106a and the second opening 106b. At that occasion, the image signal memory 120a and the image signal memory 120b are reset so as to put OFF the transistor 121c and the transistor 121d. The lower electrode 104 and the upper electrode 105 are set to the common potential.

Next, in the write period 139, the scanning line 117 undergoes scanning sequentially and the gate pulse signal 134 is applied. The signal line 118 undergoes voltage control corresponding with the gate pulse signal 134. In synchronization with timing of the gate pulse signal 134, any of potential in two states based on ON or OFF corresponding with the image signal written in each pixel is applied as potential of the signal line 118a and the signal line 118. Potential of that signal line 118 undergoes sampling at the time point of falling of the gate pulse signal 134 and is written in the image signal memory 120a and the image signal memory 120b. When an ON signal is written in the image signal memory 120a or the image signal memory 120b, the corresponding transistor 121c or the transistor 121d will be put ON so that drive voltage of the reference voltage line 119a and the reference voltage line 119b are applied to the lower electrode 104 or the upper electrode 105. Thereby the charged particles are assembled to the first opening 106a or the second opening 106b. When the transistor 121c or the transistor 121d is put OFF, the lower electrode 104 or the upper electrode 105 is retained at the common potential.

In the case of the waveform of the signal line 118a and the signal line 118b illustrated in FIG. 10, during the m-th line selection period 132, the pixel on the m-th scanning line and the pixel on the n- the signal line will provide with red display turning the lower electrode 104 is OFF and the upper electrode 105 is ON; and during the (m−1)th line selection period 131, the pixel on the (m−1)th scanning line and the pixel on the n-th signal line will provide with black display turning both of the lower electrode 104 and the upper lower electrode 105 both OFF; and during the (m+1)th line selection period 133, the pixel on the (m+1)th scanning line and the pixel on the n-th signal line will provide with white display turning both of the lower electrode 104 and the upper lower electrode 1050N. The actual drive waveform varies in waveform corresponding with the image signal.

Figure 11:
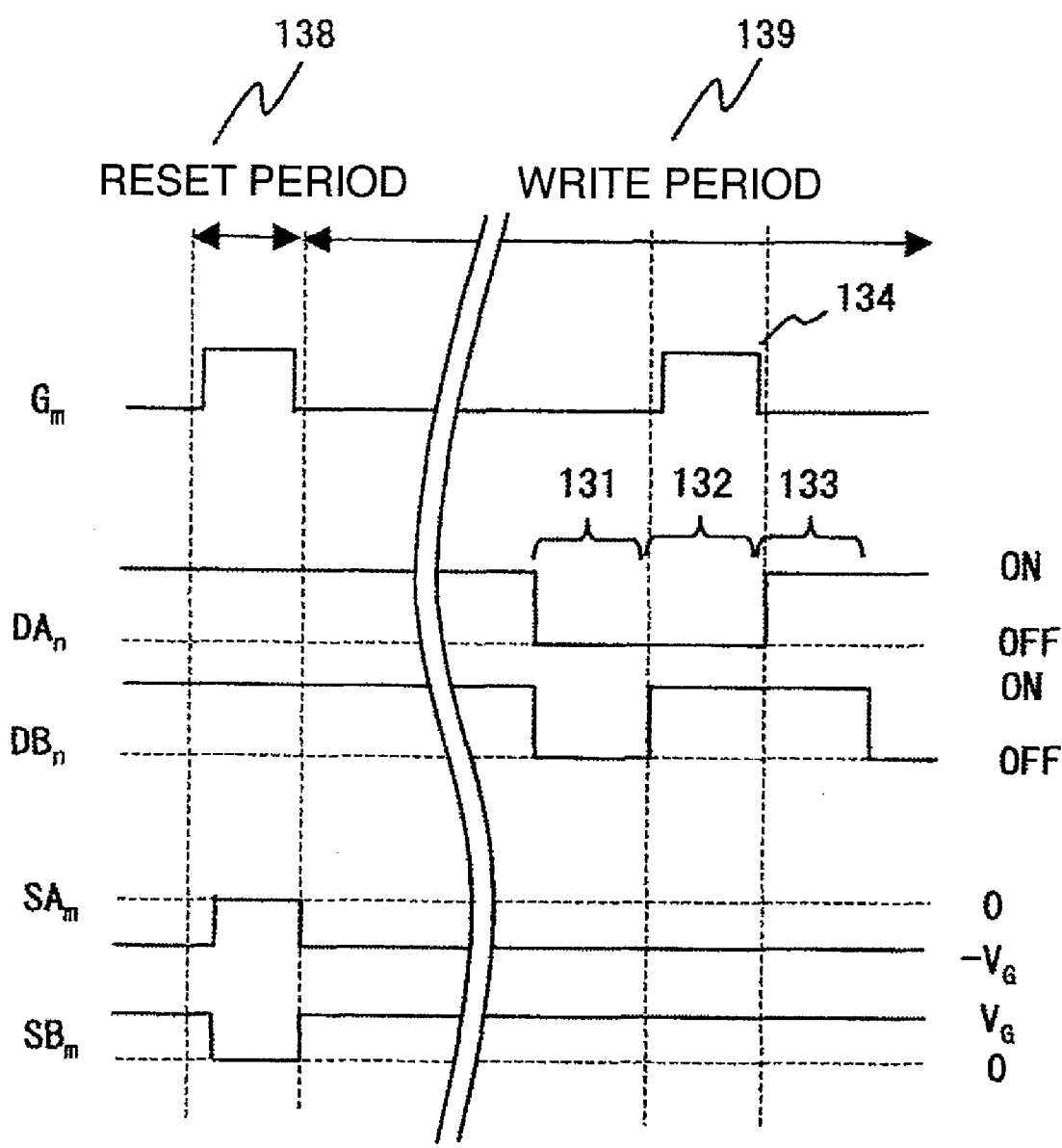
FIG. 11 illustrates a diagram describing a refresh period of a drive sequence.

FIG. 11 illustrates a drive sequence for the refresh period 137. The drive sequence for the refresh period 137 will provide with approximately the same waveform as that for the rewrite period 135 and nevertheless is different from the rewrite period 135 in that there is no need to reset the display of each pixel and the common voltage is provided without applying reset voltage to the voltage in the reference voltage line during the reset period 138. During the write period 139, the same information as the memory information written prior to the refresh period 137 is written onto the image signal memory 120a and the image signal memory 120b. In the case where the charged particles 108 receive adhesion force to be assembled in the opening 106, even if the common voltage is set during that refresh period, the charged particles 108 will not disperse from the opening 106 and no display will be disturbed. In addition, in the case where, adhesion force of the particles is weak, the particles start diffusing for a short distance after the reset period and will get assembled in the opening 106 again when information is written in the image signal memory 120. Therefore, making the refresh period 137 short, deterioration in image can be almost eliminated.

As described above, use of the image signal memory 120 enables decrease in frequency of driving the scanning line 117 and can make the power consumption of the image display device small.

For low frequency drive, with small OFF resistance of the transistor 121a and the transistor 121b, the image is possibly deteriorated. The OFF resistance refers to electric resistance when the source-drain spacing is kept in a high resistant state by controlling the gate voltage of the transistor. The OFF resistance of the transistor 121a and the transistor 121b is important in order to maintain the state of the image signal memory 120. In the case where the OFF resistance of the transistor 121a and the transistor 121b is low, potential of the signal line 118 influences the state of the image signal memory 120 to vary. A change in the state of the image signal memory 120 leads to a change in electric resistance between the source and the drain of the transistor 121c and the transistor 121d. Then inter-electrode potential difference of the unit cell 111 may fluctuate to give rise to fluctuation in luminance. Therefore, it is desirable that the potential state of the image signal memory 120 can be controlled by setting the potential of the signal line 118 for the retention period 136 to a predetermined constant potential. If that constant potential is set to the potential approximately equivalent to the signal potential (OFF potential) for putting OFF the transistor 121c and the transistor 121d, the potential of the image signal memory 120 in the OFF potential state does not fluctuate so that the OFF state of the transistor 121c and the transistor 121d is retained. Or, also in the case where the potential of the signal line 118 is in a floating state during the retention period 136, the above described constant potential is desirably once set to the potential approximately equivalent to the signal potential (OFF potential) which puts OFF the transistor 121c and the transistor 121d and thereafter the drive sequence to give rise to a floating state is adopted.

It is desired that either the transistor 121c or the transistor 121d is put ON and the other is put OFF, then the particles are assembled in the opening of the electrode on the ON side and the particles will not be assembled in the opening of the electrode on the OFF side. Accordingly, the voltage with the same polarity as the voltage of the ON-side electrode is desirably applied to the electrode on the OFF side as well. Thereby, the particles assembled in the ON side electrode are attracted more strongly than the OFF side electrode. The particles with the opposite polarity will be well assembled to the opposite electrode side 103 from the OFF side.

If the resistance between the lower electrode 104 and the upper electrode 105 is made smaller to a certain extent than the OFF resistance of the transistor 121c of the first drive device for driving the first pixel electrode being the lower electrode 104 and the transistor 121d being the second drive device for driving the second pixel electrode being the upper electrode 105, then voltage determined by resistance splitting to the OFF resistance of the transistor 121*c* and the transistor 121*d* and the resistance between the lower electrode 104 and the upper electrode 105 is desirably applied also to the electrode on the OFF side with the same polarity as the voltage of the ON-side electrode. At that occasion, it is desirable to determine the OFF resistance of the transistor 121*c* and the transistor 121*d* and the resistance between the lower electrode 104 and the upper electrode 105 so that the electrode on the OFF side will provide with desired voltage. The resistance between the lower electrode 104 and the upper electrode 105 is determined mainly by the resistivity of the electrophoresis ink and therefore can be controlled by the resistivity of the electrophoresis ink.

Figure 12:
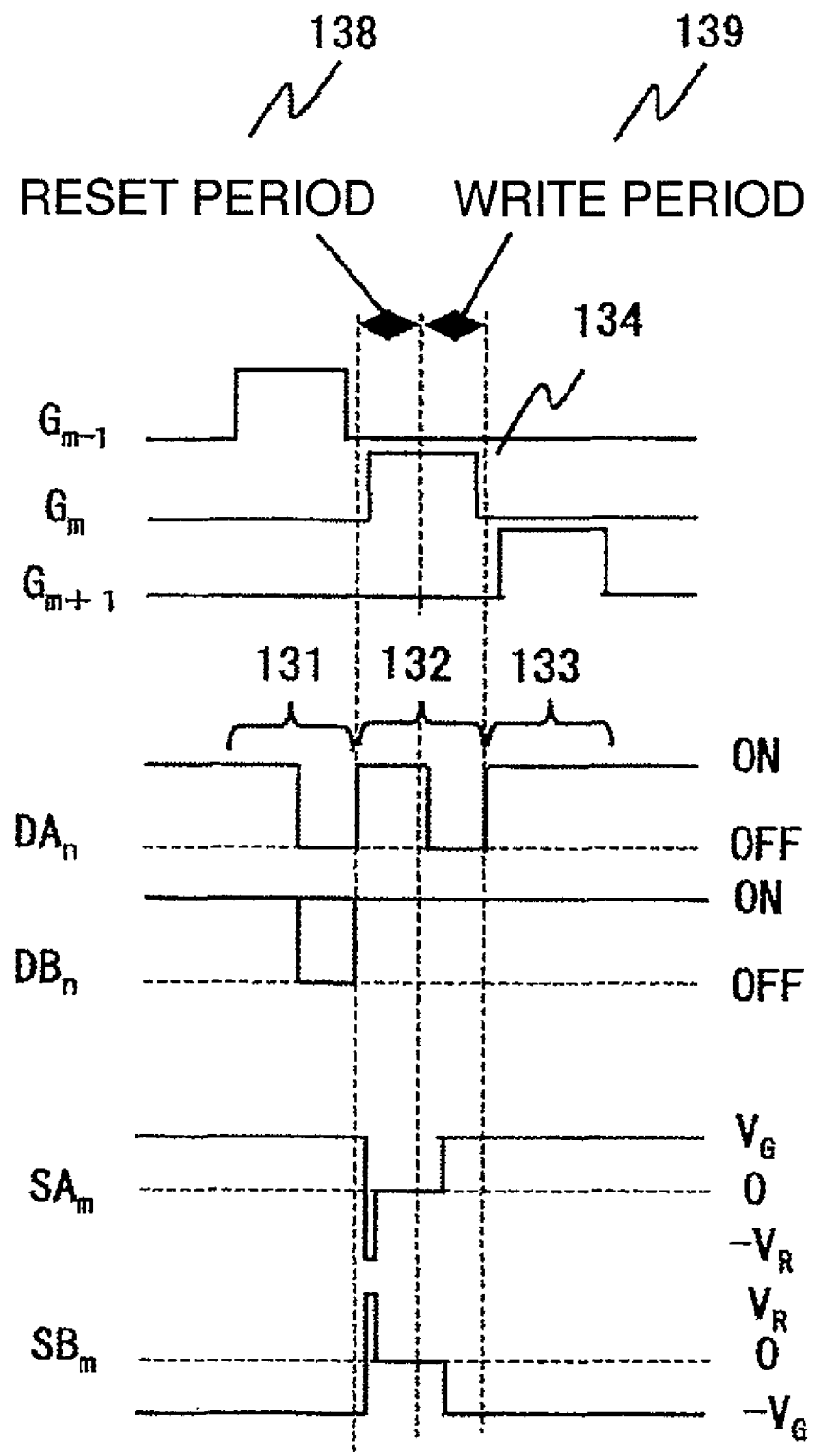
FIG. 12 illustrates a diagram describing another example of a drive sequence for a rewrite period.

FIG. 12 illustrates another embodiment of the drive method.

In the present drive method, the reset period 138 and the write period 139 will not come chronologically during the rewrite period 135 but the former half of the selection period of the scanning line 117 is taken as the reset period 138 and the latter half is taken as the write period 139. Potential (Da$_n$ and DB$_n$) of the signal line 118*a* and the signal line 118*b* during the reset period 138 is potential (ON) of bringing the display device 122*a* and the display device 122*b* into the ON state. As for the potential of the signal line 118*a* for the write period 139 and the potential of the signal line 118*b*, any one of potential in the two states (ON and OFF) is selected at the point of time when the gate pulse signal 134 rises based on whether the image signal to be written is ON or OFF and are written into the image signal memory 120*a* and the image signal memory 120*b*.

The drive waveform (potential) SA$_m$ and SB$_m$ of the reference voltage line corresponding with the scanning line G$_m$ is driven in synchronization with the gate pulse signal 134. At first, during the reset period 138, a short pulse voltage ($\pm V_R$) for dissociating the charged particles 108 assembled in the opening 106 off the opening 106 is once applied so that the charged particles 108 assembled in the opening 106 are diffused in the solvent and got reset. Thereafter the common voltage (0 V) is provided. During that reset period 38, the image signal memory 120*a* and the image signal memory 120*b* are reset so as to form OFF the transistor 121*c* and the transistor 121*d*. The lower electrode 104 and the upper electrode 105 will be set to the common potential.

Subsequently, the write period 139 will come. As for the potential of the signal line 118*a* and the signal line 118*b*, any one of potential in the two states (ON and OFF) is applied based on whether the image signal to be written onto each pixel is ON or OFF. In addition, potential of the reference voltage line 119*a* and the reference voltage line 119*b* will be set to the drive voltage $V_G$ ($-V_G$ for the reference voltage line 119*a* and $+V_G$ for the reference voltage line 119*a*) for assembling the particles in the first opening 106*a* and the second opening 106*b*. The potential of the signal line at the point of time of descent of the gate pulse signal 134 undergoes sampling and is written in the image signal memory 120*a* and the image signal memory 120*b*. When the ON signal is written to the image signal memory 120*a* or the image signal memory 120*b*, corresponding transistor 120*c* or 121*d* is formed on. Drive voltages of the reference voltage line 119*a* and the reference voltage line 119*b* are applied to the lower electrode 104 or to the upper electrode 105. The particles will be assembled to the first opening 106*a* or to the second opening 106*b*.

The drive sequence for the refresh period 137 will provide with approximately the same waveform as that for the rewrite period 135 and nevertheless is different from the rewrite period 135 in that there is no need to reset the display of each pixel and the common voltage is provided without applying reset voltage to the voltage in the reference voltage line during the reset period 138. During the write period 139, the same information as the memory information written prior to the refresh period 137 is written onto the image signal memory 120*a* or the image signal memory 120*b*. In the case where the charged particles 108 are adhered to the opening 106, no display will be disturbed during that refresh period 137. In addition, in the case where, adhesion force of the charged particle 108 is weak, the particles start diffusing for a short distance after the reset period 138 and will come back to the opening 106 again when information is written in the image signal memory 120. Therefore, making the refresh period 137 shorter than the response time of the particles, deterioration in image can be almost eliminated.

According to the drive method of FIG. 10, the entire screen is reset during the rewrite period 135. Therefore the image to be written newly is not apt to get influenced by the image displayed before. In addition, it is possible to make drive frequency of the signal line low. On the other hand, in the drive method of FIG. 10, the image on the entire screen gets reset during the rewrite period 135. Therefore the images once disappear and the image looks like flickering. However, in the drive method of FIG. 12, without occurrence of flicker, the image can be rewritten.

The drive circuit illustrated in FIG. 8 can realize a memory built-in pixel system with single-channel transistor and can make the refresh rate slower even if the image display device is highly fine and can make power consumption small. In addition, due to the configuration of a single-channel transistor, the apparatus can be produced with a-Si TFT, simplifying production. Therefore, also with a substrate with low heat resistance such as a plastic substrate and the like enables production of the display device.

So far, the case where capacitance is used as the image signal memory 120 is illustrated. However, a nonvolatile memory may be used as the image signal memory. In that case, there is no need to refresh the image signal memory regularly. In the case where it is not necessary to rewrite an image, the reference voltage line may be kept at a constant voltage.

The drive method and the drive circuit will not be limited to the embodiments illustrated so far. Conventionally known drive systems and circuits can be used to carry out driving operations. For example, without using a memory device, retentive capacity may be formed inside a pixel to apply voltage to a unit cell for a constant period until the retentive capacity is refreshed with the voltage retention by that retentive capacity. In that case, the capacitance between the lower electrode 104 and the upper electrode 105 can be used as the retentive capacity.

In the embodiment having been described so far, a reflecting layer 114 can be provided on the substantially entire opening of the unit cell 111 and the entire surface of the unit cell 111 except the portion of the bulkhead 109 can be utilized as the opening and, therefore, reflective display with high reflection rate and high contrast will become feasible. In addition, the opposite electrode 103 does not have to undergo patterning and the transparent substrate 101 does not have to undergo strict position adjustment for the substrate 102. Therefore, assembly of the image display device is easy. In addition, voltage of the opposite electrode 103 does not have to be driven. Therefore, the drive is simplified. In addition, moreover, a single electrophoresis ink 100 is sealed in the entire image display device to, thereby, enable color display and the image display device is assembled easily. In the case where the electrophoresis ink 100 is encapsulated inside the bulkheads 109, a portion thereof may be notched with thermoplastic material to provide a hole to establish linking to the adjacent unit cell 111 through the hole prior to encapsulation and to apply heat to close the hole at the time when the transparent substrate 101 is adhered to the side of the substrate 102.

Use of the unit cell 111 having been described so far enables four-color display as an image display device. Therefore, display can be carried out by changing the color of a portion of the display portion as multicolor. In addition, the image display device is provided with a touch panel and the like, enabling a utilization method such as display with a line marker in concert with inputting and input by changing color so as to make an added portion recognizable.

Next, a second embodiment of the present invention will be described with reference to FIG. 13.

Figure 13:
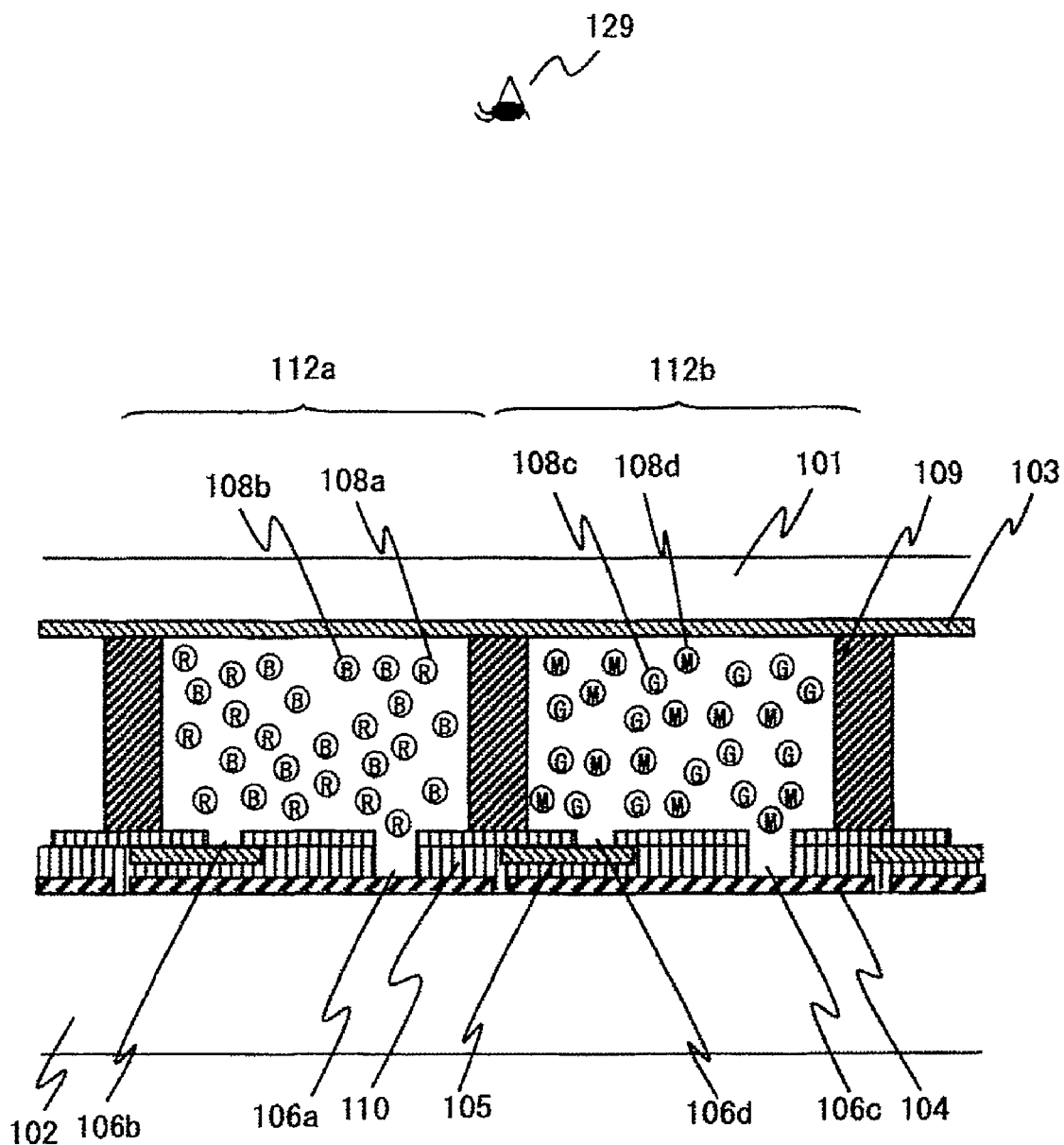
FIG. 13 illustrates another section of a unit cell of an image display device related to the present invention.

FIG. 13 illustrates an example of a section of a unit cell of an image display device. The unit pixel is configured by two sub-pixel regions for displaying respectively different colors. Here, for the sub-pixel 112a, likewise the first embodiment, positively charged red (R) charged particle 108a and negatively charged blue (B) charged particle 108b are used. For the sub-pixel 112b, the positively charged green (G) charged particle 108c and negatively charged magenta (M) charged particle 108d were used. With the magenta particles establishing complimentary color with green, the mixed state of the green charged particle 108c and the magenta charged particle 108d will make black.

Likewise the unit cell of the first embodiment, the respective sub-pixels 112a and 112b are driven independently. Thereby, the sub-pixel 112a can display white, black red and blue while the sub-pixel 112b can display four colors of white, black, green and magenta. With those two sub-pixels, full-color display is feasible.

Table 1 illustrates primary colors that are displayable by combination of colors of those two sub-pixels. Thus, two sub-pixels can display white, gray and black and three primary colors of red, green and blue by addition mixture and cyan, yellow and magenta establishing complimentary color with them and full-color display is feasible. Lighter color can be displayed on red, green and blue and binary tone can be displayed.

Here, the movement mode of the particles for display is likewise Embodiment 1. In each sub-pixel region, assemblage to the first openings 106a and 106c, the second openings 106b and 106d and the opposite electrode 103 and dispersion into the ink take place. In each sub-pixel region, likewise FIGS. 3A to 3D, the particles are moved so that colors from monochrome to full color can be expressed.

TABLE 1

| First sub-pixel | Second sub-pixel | Display |
| --- | --- | --- |
| black (R, B) | black (G, C) | black |
| red | black (G, C) | red |
| blue | black (G, C) | blue |
| black (R, B) | green | green |
| black (R, B) | magenta | magenta |
| blue | green | cyan |
| red | green | yellow |
| red | white | light red |
| blue | white | light blue |
| white | green | light green |
| white | magenta | light cyan |
| black | white | gray |
| white | black | gray |
| white | white | white |

The combination of particle colors will not be limited to the combination illustrated herein. Using, for one sub-pixel, particles in two primary colors selected from the three primary colors in addition color mixture and using, for the other sub-pixel, particles in combination of particles in the remaining one color among the three primary colors in addition color mixture so as to create black in the mixed state and in the color establishing complimentary color with that primary color, 8 colors (white, gray, black, red, green, blue, cyan, yellow and magenta) required for full color can be displayed.

Figure 14:
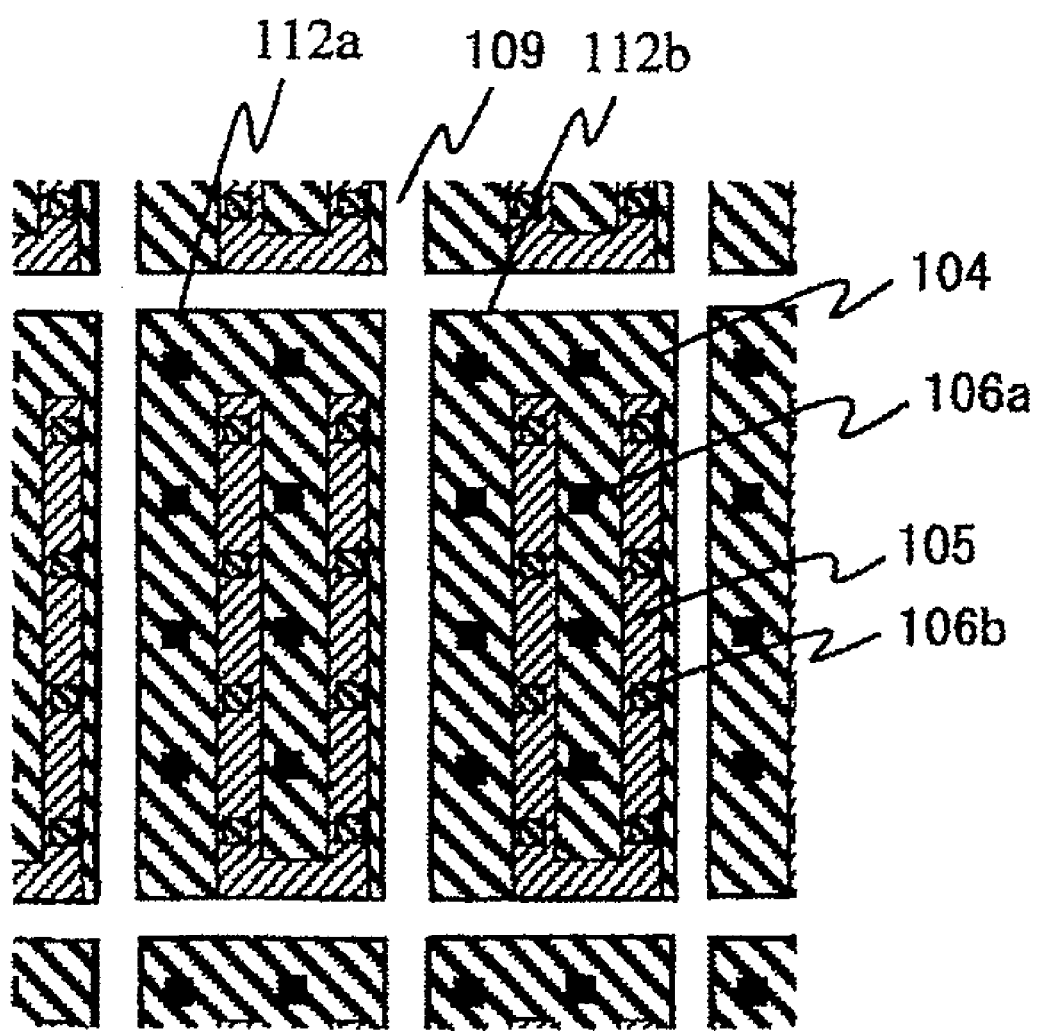
FIG. 14 illustrates still another plan view of a unit cell of an image display device related to the present invention.

FIG. 14 illustrates an example of a plan view corresponding with the section in FIG. 13.

The unit pixel was approximately a square. The square-shaped unit pixel was divided into halves, which were respectively enclosed by bulkheads 109 and respectively taken as sub-pixel 112a and sub-pixel 112b. In the respective sub-pixel region, a plurality of first openings 106a and second openings 106b were arranged. The lower electrode 104 was arranged like a sheet inside the entire sub-pixel. The upper electrode 105 was arranged in a comb-like state inside the sub-pixel. The shape of a sub-pixel does not necessarily have to be rectangular but can be divided into triangular shape. The other shapes can be adopted. In addition, the sub-pixel 112a and the sub-pixel 112b do not necessarily have to be sized same. By changing the size of the sub-pixel, the displayable color reproduction range can be controlled.

In the present embodiment, two units of sub-pixel 112a and sub-pixel 112b are used to display full-color image. Therefore, in order to display full-color image, three sub-pixels are not required as in the conventional case, but the area of the sub-pixel can be made larger. Consequently, the area occupied by the bulkheads can be made less to make the aperture ratio of the pixel larger. Therefore, the luminance (reflection percentage or transmittance) for white color display can be made large. In addition, the number of pixel gets less to enable decrease in number of the drive circuits.

In the case where only black and white display is implemented with the present embodiment, the resolution in one direction (horizontal direction in the description so far) can be made twice larger than the case where color display is implemented. Otherwise, the sub-pixel being a square pixel may be arranged to give the same resolution vertically and horizontally at the occasion of black and white display so that the resolution in one direction for color display decreases by half.

In the present embodiment, two kinds of electrophoresis ink 100 need to be applied to the sub-pixel 112a and the sub-pixel 112b separately. An ink jet apparatus was used to enable separate application of electrophoresis ink 100 to predetermined locations. At that occasion, as for the bulkhead 109, a portion of the bulkhead 109 confining the sub-pixel to seal the same electrophoresis ink 100 may be notched with thermoplastic material to provide a hole to establish linking to the adjacent sub-pixel. The hole may be closed by applying heat at the occasion of adhesion of the transparent substrate 101 to the side of the substrate 102. That arrangement will make it difficult for bubbles to enter at the occasion of the adhering operation of the transparent substrate 101. Otherwise, the ink can be applied individually by printing. For example, the concentrated two kinds of ink are printed in the predetermined locations. Thereafter, adding the transmissive solvent 107 and sealing, a desired density of electrophoresis ink 100 can be attained. Otherwise, with a conventionally adopted system, the two kinds of electrophoresis ink 100 can be applied individually.

Next, a third embodiment of the present invention will be described with reference to FIG. 15.

Figure 15:
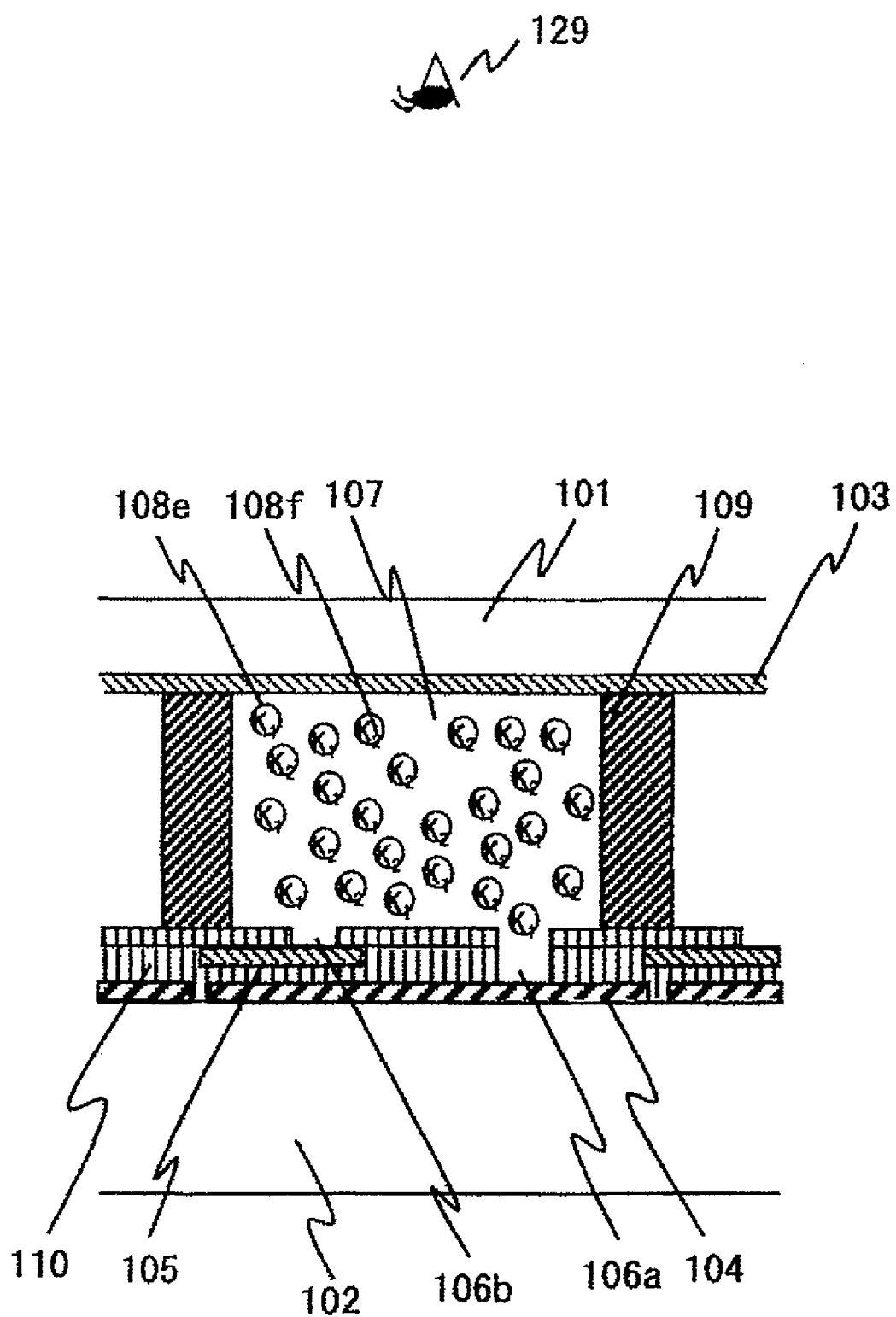
FIG. 15 illustrates another section of a unit cell of an image display device related to the present invention.

FIG. 15 illustrates a section of a unit cell (unit pixel) 111 of an image display device. The unit cell 111 is surrounded and sectioned by bulkheads 109. Two kinds of charged particles (108e and 108f) different in chargeability are dispersed in a transmissive solvent 107 inside the bulkheads 109. For the present embodiment, as two kinds of charged particle, different black particles different in optical density were used. The optical density can vary in the case where particles ($K_1$) 108e with thin optical density are assembled in the opening and in the case where particles ($K_2$) 108f with thick optical density are assembled in the opening. Therefore, one unit cell can display four tones from black to white.

Any black pigment selected from the group consisting of carbon black, graphite, black iron oxide, ivory black, chrome dioxide and the like is utilizable and is preferably used individually or in a prepared state. Moreover, those pigments undergo coating with a dispersion agent such as acryl polymer and the like to improve dispersion property and increases in zeta potential of particles with surfactant. Then stability and response speed of the charged particles is improved and preferable.

Optical density of the particles can be adjusted by changing the kind of pigment, proportion of pigment to polymer coating agent, particle diameter of a particle, mixing proportion of particles and the like.

Moreover, changing the area of the first opening 106a and the second opening 106b, tone can be controlled more sophisticatedly. In that case, it is desired that positive voltage and negative voltage are both arranged to be applied to the lower electrode 104 and the upper electrode 105 and that the charged particle 108e and the charged particle 108f can be controlled to get assembled to which of the first opening 106a and the second opening 106b. In that case, display with not less than six tones in total from black to white is feasible.

So far, the case where particles are dispersed in liquid has been described but is not necessarily limited to liquid but applicable to the case where particles are moved in a gas or in vacuum as well.

In addition, so far, particles different in chargeability are adopted for description. However, particles different in charge amount, diameter and mobility of particle can be used to control the location where two or more kinds of particles are assembled in utilization of different in movement speed of particles.

The image display device of the present invention can obtain reflective image display with high luminance and attain low consumption power and, therefore, is applicable to a display appliance selected from the group consisting of electronic books, electronic posters, interior electronic hanging advertisements and, in particular, to a color image display appliances. In addition, so far, the case where pixels arranged in a matrix state undergo active drive has been illustrated, but in the case of segment, passive drive may be adopted. Such a case is applicable to electronic price tag and the like.

Example 1

As an image display device, the first embodiment is adopted.

On a substrate 102 where a transistor circuit with a-Si was formed, a concave and convex layer 113 was formed with resin. Thereabove, Al and ITO were stacked and deposited as a lower electrode 104 by sputtering. Subsequently, an insulating layer 110a made of $SiO_2$ was deposited by plasma CVD method. Thereafter, as an upper electrode 105, ITO was sputtered and underwent patterning process by photolithography and wet etching. Next, bulkhead layer made of cardo polymer with 5-μm height and 5-μm width underwent patterning into a lattice state to form bulkheads 109. Moreover, the insulating layer 110b made of $SiO_2$ was deposited by the plasma CVD method and thereafter underwent processing by photolithography and dry etching to form an opening. The spacing made by the bulkheads 109 was filled with transmissive solvent 107 where two kinds of charged particles 108 were dispersed. The substrate 101 where ITO transmissive conducting film had been formed was brought into integration. After the sealing operation, an image display device was obtained. For the present image apparatus, resolution was 400 ppi and the pixel was a square lattice with 50 μm pitch. For the present image display device, the opposite electrode 103 was maintained at 0 V. The lower electrode 104 and the upper electrode 105 underwent modulation with +/−10 V to, thereby, switch, on a pixel basis, the state where the charged particles 108 dispersed in the transmissive solvent 107 were assembled in the vicinity of the opening 106 and the state in dispersion in the entire pixel. Thereby, image display in four colors of black, white, red and blue was implemented.

As the electrophoresis ink 100, silicon oil with low viscosity as the transmissive solvent 107 was used. Particles with diameter of 0.2 μm subject to coating with resin were respectively dispersed with particle density of 5 wt % and were encapsulated and sealed in side the bulkheads 109. The particle diameter in that case will be 1/25 of the cell gap of 5 μm. In the present example, the memory property of the charged particles 108 was made not strong and the lower electrode 104 and the upper electrode 105 were set to the common voltage. Then the homogeneous particles 108 were dispersed by mutual electrostatic repulsion so that the particles were mixed each other.

The aperture ratio of the opening 106 was 90% for the first opening 106a and for the second opening 106b respectively. Therefore, the aperture ratio of the unit cell except the bulkheads 109 and the opening 106 will reach 73%.

In the present example, charged particles 108 with small diameter were used. Therefore even with the cell gap of 5 μm, it became possible to assemble the charged particles 108 to the opening 106. Since the cell gap is narrow, high resolution is attainable and moreover it was confirmed that resolution of 600 ppi was realizable. Since each pixel is partitioned by the bulkheads 109, disturbance due to inter-pixel movement of particles is preferably prevented.

The present image display device has a wide aperture ratio to enable four-color display with high reflection percentage and high contrast.

Example 2

As an image display device, the second embodiment is adopted.

On a substrate 102 where a transistor circuit with a-Si was formed, a concave and convex layer 113 was formed with resin. Thereabove, Al and ITO were stacked and deposited as a lower electrode 104 by sputtering. Subsequently, an insulating layer 110a made of $SiO_2$ was deposited by plasma CVD method. Thereafter, as an upper electrode 105, ITO was sputtered and underwent patterning process by photolithography and wet etching. Next, bulkhead layer made of cardo polymer with 5-μm height and 5-μm width underwent patterning into a lattice state to form bulkheads 109. Moreover, the insulating layer 110b made of $SiO_2$ was deposited by the plasma CVD method and thereafter underwent processing by photolithography and dry etching to form an opening. Two kinds of electrophoresis ink 100 were dropped in the spacing made by the bulkheads 109. The substrate 101 where ITO transmissive conducting film had been brought into integration. After the sealing operation, an image display device was obtained. For the present image apparatus, resolution was 300 ppi and the pixel was a square lattice with 85 μm pitch. That pixel was configured by two units of sub-pixel and the sub-pixel was sized to 42×85 μm. For the present image display device, the opposite electrode 103 was maintained at 0 V. The lower electrode 104 and the upper electrode 105 underwent modulation with +/−10 V to, thereby, switch, on a pixel basis, the state where the particles 108 dispersed in the transmissive solvent 107 were assembled in the vicinity of the opening 106 and the state in dispersion in the entire pixel.

As the electrophoresis ink 100, silicon oil with low viscosity as the transmissive solvent 107 was used. Particles with diameter of 0.2 μm subject to coating with resin were respectively dispersed with particle density of 5 wt % and were encapsulated and sealed in side the bulkheads 109. The particle diameter in that case will be ⅕ of the cell gap of 5 μm.

The aperture ratio of the opening 106 was 90% for the first opening 106a and for the second opening 106b respectively. Therefore, the aperture ratio of the unit cell except the bulkheads 109 and the opening 106 will reach 74%.

In the present example, particles with small diameter were used. Therefore even with the cell gap of 5 μm, it became possible to assemble the particles to the opening 106. Since the cell gap was narrow, high resolution was attainable and moreover it was confirmed that resolution of 600 ppi was realizable.

The present image display device has a wide aperture ratio to enable full-color display with high reflection percentage and high contrast.

Example 3

As an image display device, the third embodiment is adopted.

On a substrate 102 where a transistor circuit with a-Si was formed, a concave and convex layer 113 was formed with resin. Thereabove, Al and ITO were stacked and deposited as a lower electrode 104 by sputtering. Subsequently, an insulating layer 110a made of $SiO_2$ was deposited by plasma CVD method. Thereafter, as an upper electrode 105, ITO was sputtered and the ITO underwent patterning process by photolithography and wet etching. Next, bulkhead layer made of cardo polymer with 5-m height and 5-μm width underwent patterning into a lattice state to form bulkheads 109. Moreover, the insulating layer 110b made of $SiO_2$ was deposited by the plasma CVD method and thereafter underwent processing by photolithography and dry etching to form an opening. The spacing made by the bulkheads 109 was filled with transmissive solvent 107 where two kinds of charged particles 108 were dispersed. The substrate 101 where ITO transmissive conducting film had been formed was brought into integration. After the sealing operation, an image display device was obtained. For the present image apparatus, resolution was 600 ppi and the pixel was a square lattice with 42 μm pitch. For the present image display device, the opposite electrode 103 was maintained at 0 V. The lower electrode 104 and the upper electrode 105 underwent modulation with +/−10 V to, thereby, switch, on a pixel basis, the state where the particles 108 dispersed in the transmissive solvent 107 were assembled in the vicinity of the opening 106 and the state in dispersion in the entire pixel. Thereby, image display in black and white four tones was implemented.

As the electrophoresis ink 100, silicon oil with low viscosity as the transmissive solvent 107 was used. Carbon black particles with diameter of 0.2 μm subject to coating with resin were respectively dispersed with particle density of 5 wt % and were encapsulated and sealed in side the bulkheads 109. The particle diameter in that case will be ⅕ of the cell gap of 5 μm. Changing the particle diameter of carbon black and resin for coating, the optical density and chargeability of the particles were changed.

The aperture ratio of the opening 106 was 90% for the first opening 106a and for the second opening 106b respectively. Therefore, the aperture ratio of the unit cell except the bulkheads 109 and the opening 106 will reach 67%.

The present image display device has a wide aperture ratio to enable tone black and white display with high reflection percentage and high contrast.

The image display device of the present invention can obtain reflective image display with high luminance and, therefore, can attain low consumption power and is applicable to a display appliance selected from the group consisting of electronic books, electronic posters, electronic hanging advertisements and, in particular, to a color image display appliances.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display device comprising,
a pair of substrates;
one substrate of the pair of substrates where a first pixel electrode and a second pixel electrode arranged on the first pixel electrode are formed;
another substrate, where an opposite electrode is formed, arranged opposite to the above described one substrate;
a plurality of bulkheads dividing the spacing between the one substrate and the other substrate into a plurality of pixel regions;
two kinds of charged particles filling, in plurality, to a pixel region surrounded by the one substrate, the other substrate and the bulkheads and being different in color and in charged polarity; and
a first insulating layer and a second insulating layer;
wherein the first insulating layer having a first insulating portion and a first opening, the second insulating layer having a second insulating portion and a second opening, the first insulating portion being formed between the first pixel electrode and the second pixel electrode, the first opening being formed on the first pixel electrode, the second insulating portion and the second opening being formed on the second pixel electrode, the first pixel electrode coming into contact with one charged particle of two kinds of charged particles in the first opening; and the second pixel electrode coming into contact with the other charged particle of the two kinds of charged particles in the second opening;
wherein potential between the first pixel electrode and the opposite electrode and between the second pixel electrode and the opposite electrode is controlled to display an image.

2. An image display device comprising,
a pair of substrates;
one substrate of the pair of substrates where a first pixel electrode and a second pixel electrode are formed;
another substrate, where an opposite electrode is formed, arranged opposite to the above described one substrate;

a plurality of bulkheads dividing the spacing between the one substrate and the other substrate into a plurality of pixel regions;

two kinds of charged particles filling, in plurality, to a pixel region surrounded by the one substrate, the other substrate and the bulkheads and being same color but different in charged polarity;

a first insulating layer and a second insulating layer;

wherein the first insulating layer having a first insulating portion and a first opening, the second insulating layer having a second insulating portion and a second opening, the first insulating portion being formed between the first pixel electrode and the second pixel electrode, the first opening being formed on the first pixel electrode, the second insulating portion and the second opening being formed on the second pixel electrode, the first pixel electrode coming into contact with one charged particle of two kinds of charged particles in the first opening; and the second pixel electrode coming into contact with the other charged particle of the two kinds of charged particles in the second opening;

wherein potential between the first pixel electrode and the opposite electrode and between the second pixel electrode and the opposite electrode is controlled to display an image.

3. The image display device according to claim 1 or claim 2, wherein
an image is displayed by switching the state of the charged particles among the state of being assembled in the first opening, the state of being assembled in the second opening, the state of being assembled on the opposite electrode and the state of being dispersed in the entire pixel region.

4. The image display device according to claim 1 or claim 2, wherein
the first pixel electrode is a diffuse reflection electrode and arranged to cover the entire plane inside the pixel region.

5. The image display device according to claim 1 or claim 2, wherein
the opposite electrode is continuously formed all over the other substrate.

6. The image display device according to claim 1 or claim 2, wherein
the charged particles are dispersed in liquid or gas.

7. The image display device according to claim 1 or claim 2, wherein
a plurality of the first openings is arranged in the first insulating layer and a plurality of the second openings is arranged in the second insulating layer.

8. The image display device according to claim 1 or claim 2, wherein
the image display device has a first drive device to drive the first pixel electrode and a second drive device to drive the second pixel electrode; and
OFF resistance of the first drive device and the second drive device is larger than resistance between the first pixel electrode and the second pixel electrode.

9. The image display device according to claim 1 or claim 2, wherein the image display device has:
a first memory device for storing voltage applied to the first pixel electrode; and
a second memory device for storing voltage applied to the second pixel electrode.

10. The image display device according to claim 1 or claim 2, wherein
the pixel region is a region surrounded by a plurality of signal lines and a plurality of scanning lines arranged so as to cross the plurality of signal lines;
the pixel region has a plurality of memory devices and reference voltage lines connected to the plurality of memory devices respectively;
drive waveform of voltage signals inputted to the reference voltage line has a period for rewriting image data and a period for retaining the image data; and
the memory devices undergo refreshment simultaneously during the rewriting period to write brand new image data.

11. The image display device according to claim 1 or claim 2, wherein
in the first electrode, a transparent electrode layer is laminated onto a metal material, and
the transparent electrode layer comes into contact with an electrophoresis ink in the first opening.

12. The image display device according to claim 1 or claim 2, wherein the particle density is 1 wt % to 20 wt %.

13. The image display device according to claim 1 or claim 2, wherein the thickness of the combination of the first and the second insulating layer is 5 times larger than the particle diameter.

14. The image display device according to claim 1 or claim 2, wherein an aperture of the openings is 5 to 40%.

15. An image display device comprising,
a pair of substrates;
one substrate of the pair of substrates where a first pixel electrode and a second pixel electrode are formed;
another substrate, where an opposite electrode is formed, arranged opposite to the above described one substrate;
a plurality of bulkheads dividing the spacing between the one substrate and the other substrate into a plurality of pixel regions;
two kinds of charged particles filling, in plurality, to a sub-pixel region surrounded by the one substrate, the other substrate and the bulkheads and being different in color and in charged polarity;
a first insulating layer and a second insulating layer;
wherein the first insulating layer having a first insulating portion and a first opening, the second insulating layer having a second insulating portion and a second opening, the first insulating portion being formed between the first pixel electrode and the second pixel electrode, the first opening being formed on the first pixel electrode, the second insulating portion and the second opening being formed on the second pixel electrode, the first pixel electrode coming into contact with one charged particle of two kinds of charged particles in the first opening; and the second pixel electrode coming into contact with the other charged particle of the two kinds of charged particles in the second opening;
wherein two sub-pixel regions constitute a pixel, one sub-pixel region is charged with charged particles in two colors selected from the three primary colors in addition mixture;
another sub-pixel region in the two sub-pixel regions is charged with charged particles in the remaining single color not included in the one sub-pixel and the charged particles establishing complimentary color on the primary color, wherein potential between the first pixel electrode and the opposite electrode and between the second pixel electrode and the opposite electrode is controlled to display an image.

16. The image display device according to claim 15, wherein an image is displayed by switching the state of the charged particles among the state of being assembled in the first opening, the state of being assembled in the second opening, the state of being assembled on the opposite electrode and the state of being dispersed in the entire pixel region.

17. The image display device according to claim 15, wherein the first pixel electrode is a diffuse reflection electrode and arranged to cover the entire plane inside the pixel region.

18. The image display device according to claim 15, wherein the opposite electrode is continuously formed all over the other substrate.

19. The image display device according to claim 15, wherein the charged particles are dispersed in liquid or gas.

20. The image display device according to claim 15, wherein a plurality of the first openings is arranged in the first insulating layer and a plurality of the second openings is arranged in the second insulating layer.

21. The display device according to claim 15, wherein the image display device has:

a first drive device to drive the first pixel electrode and a second drive device to drive the second pixel electrode; and OFF resistance of the first drive device and the second drive device is larger than resistance between the first pixel electrode and the second pixel electrode.

22. The image display device according to claim 15, wherein the image display device has:

a first memory device for storing voltage applied to the first pixel electrode; and a second memory device for storing voltage applied to the second pixel electrode.

23. The image display device according to claim 15, wherein the pixel is a region surrounded by a plurality of signal lines and a plurality of scanning lines arranged to intersect the signal lines;

the pixel has in its inside a plurality of memory devices and a reference voltage line respectively connected to the memory devices;

drive waveform of a voltage signal inputted to the reference voltage line has a period for rewriting image data and a period for retaining the image data; and new image data is written after refreshing the plurality of memory device at the same time during the rewrite period.

* * * * *